US009454849B2

(12) United States Patent
Mount et al.

(10) Patent No.: US 9,454,849 B2
(45) Date of Patent: Sep. 27, 2016

(54) AUGMENTED REALITY PLAYSPACES WITH ADAPTIVE GAME RULES

(71) Applicant: MICROSOFT TECHNOLOGY LICENSING, LLC, Redmond, WA (US)

(72) Inventors: Brian J. Mount, Seattle, WA (US); Jason Scott, Kirkland, WA (US); Ryan L. Hastings, Seattle, WA (US); Darren Bennett, Seattle, WA (US); Stephen G. Latta, Seattle, WA (US); Daniel J. McCulloch, Kirkland, WA (US); Kevin A. Geisner, Mercer Island, WA (US); Jonathan T. Steed, Redmond, WA (US); Michael J. Scavezze, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

(21) Appl. No.: 13/689,378

(22) Filed: Nov. 29, 2012

(65) Prior Publication Data

US 2013/0328927 A1    Dec. 12, 2013

Related U.S. Application Data

(63) Continuation of application No. 13/288,350, filed on Nov. 3, 2011, now abandoned.

(51) Int. Cl.
*G09G 5/00* (2006.01)
*G06T 19/00* (2011.01)
(Continued)

(52) U.S. Cl.
CPC ............. *G06T 19/006* (2013.01); *A63F 13/10* (2013.01); *G06T 19/20* (2013.01); *A63F 2300/30* (2013.01); *A63F 2300/6676* (2013.01); *A63F 2300/69* (2013.01); *G06T 2219/2016* (2013.01)

(58) Field of Classification Search
CPC ............................. G96T 19/006; G06T 19/00
USPC ................................................... 345/633, 632
See application file for complete search history.

(56) References Cited

U.S. PATENT DOCUMENTS 6,335,731 B1 *   1/2002   Yamamoto ................... 345/420
7,002,551 B2     2/2006   Azuma et al.
(Continued)

OTHER PUBLICATIONS

H. Kato et al., "Virtual Object Manipulation of a Table-Top AR Environment," Proc. Int'l Symp. Augmented Reality 2000 (ISAR 00), IEEE CS Press, Los Alamitos, Calif., 2000, pp. 111-119.*

(Continued)

*Primary Examiner* — Devona Faulk
*Assistant Examiner* — Jin Ge
(74) *Attorney, Agent, or Firm* — Dan Choi; Micky Minhas

(57) ABSTRACT

A system for generating a virtual gaming environment based on features identified within a real-world environment, and adapting the virtual gaming environment over time as the features identified within the real-world environment change is described. Utilizing the technology described, a person wearing a head-mounted display device (HMD) may walk around a real-world environment and play a virtual game that is adapted to that real-world environment. For example, the HMD may identify environmental features within a real-world environment such as five grassy areas and two cars, and then spawn virtual monsters based on the location and type of the environmental features identified. The location and type of the environmental features identified may vary depending on the particular real-world environment in which the HMD exists and therefore each virtual game may look different depending on the particular real-world environment.

20 Claims, 17 Drawing Sheets

(51) Int. Cl.
*G06T 19/20* (2011.01)
*A63F 13/40* (2014.01)

(56) References Cited

U.S. PATENT DOCUMENTS

| | | | |
|---|---|---|---|
| 7,479,967 B2 | 1/2009 | Bachelder et al. | |
| 2003/0032484 A1* | 2/2003 | Ohshima et al. | 463/43 |
| 2005/0231532 A1* | 10/2005 | Suzuki et al. | 345/633 |
| 2006/0105838 A1 | 5/2006 | Mullen | |
| 2008/0094417 A1* | 4/2008 | Cohen | 345/632 |
| 2009/0024703 A1* | 1/2009 | Tamura | H04L 12/1827 709/204 |
| 2009/0221368 A1 | 9/2009 | Yen | |
| 2009/0221374 A1 | 9/2009 | Yen | |
| 2009/0244097 A1* | 10/2009 | Estevez | 345/633 |
| 2010/0045701 A1 | 2/2010 | Scott et al. | |
| 2010/0215191 A1* | 8/2010 | Yoshizawa | G10L 21/0208 381/94.2 |
| 2010/0287485 A1* | 11/2010 | Bertolami et al. | 715/764 |
| 2010/0321540 A1* | 12/2010 | Woo et al. | 348/241 |
| 2011/0025689 A1* | 2/2011 | Perez et al. | 345/420 |
| 2011/0102460 A1 | 5/2011 | Parker | |
| 2012/0001938 A1* | 1/2012 | Sandberg | 345/633 |
| 2012/0113141 A1* | 5/2012 | Zimmerman et al. | 345/633 |
| 2012/0242865 A1* | 9/2012 | Vartanian | H04N 5/23206 348/239 |

OTHER PUBLICATIONS

Fotis Liarokapis, Louis Macan, Gary Malone, Genaro Rebolledo-Mendez, and Sara de Freitas. A pervasive augmented reality serious game. Games and Virtual Worlds for Serious Applications, Conference in, 0:148-155, 2009.*

"AR Second Life", Retrieved on: Sep. 7, 2011, Available at: http://arsecondlife.gvu.gatech.edu/proj_playspace.html.

Caudell, et al., "Augmented Reality: An Application of Heads-Up Display Technology to Manual Manufacturing Processes", In Proceedings of the Twenty-Fifth Hawaii International Conference on System Sciences, vol. 2, Jan. 7-10, 1992, pp. 659-669.

U.S. Appl. No. 13/539,043, filed Jun. 29, 2012.

* cited by examiner

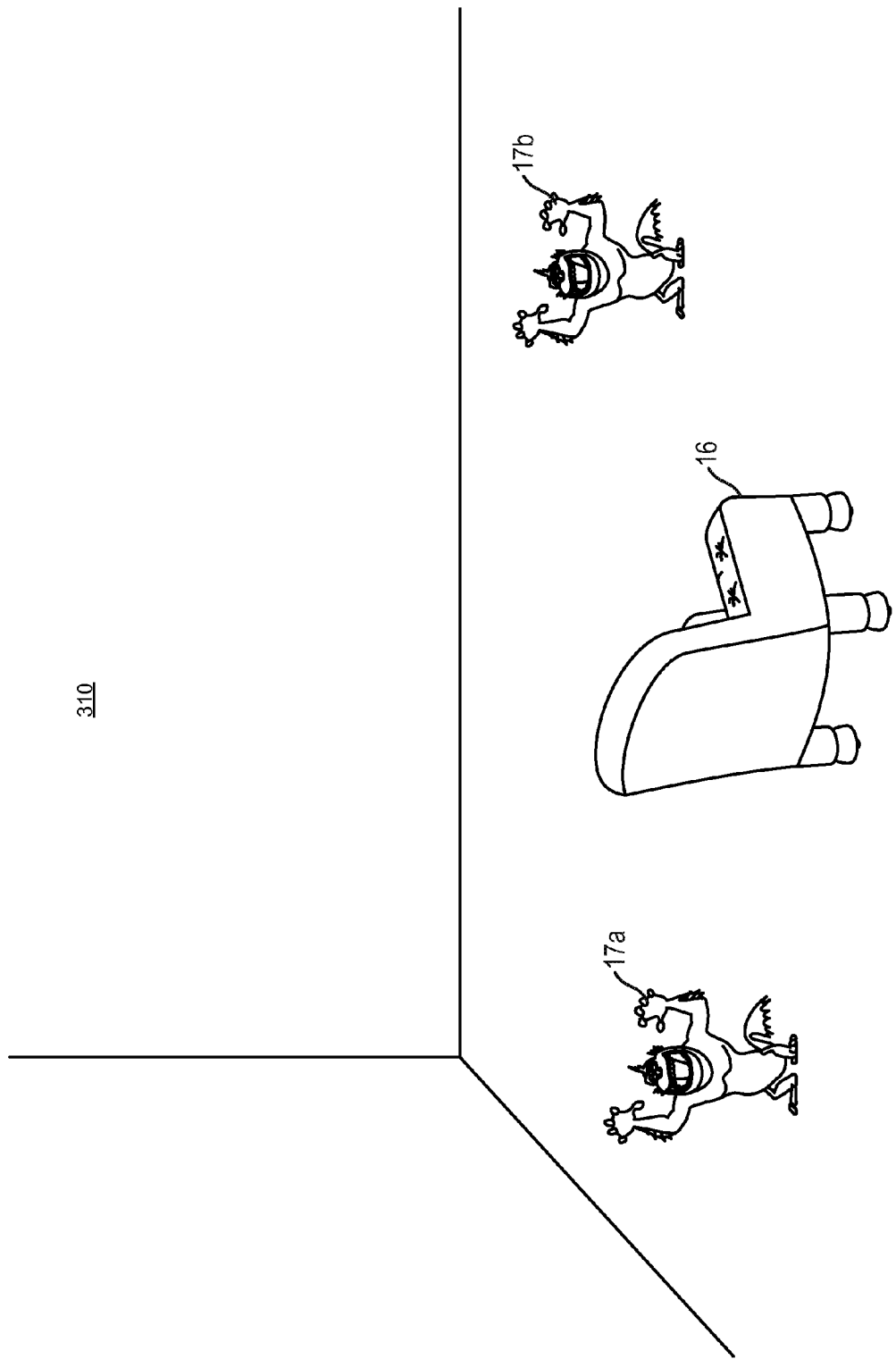

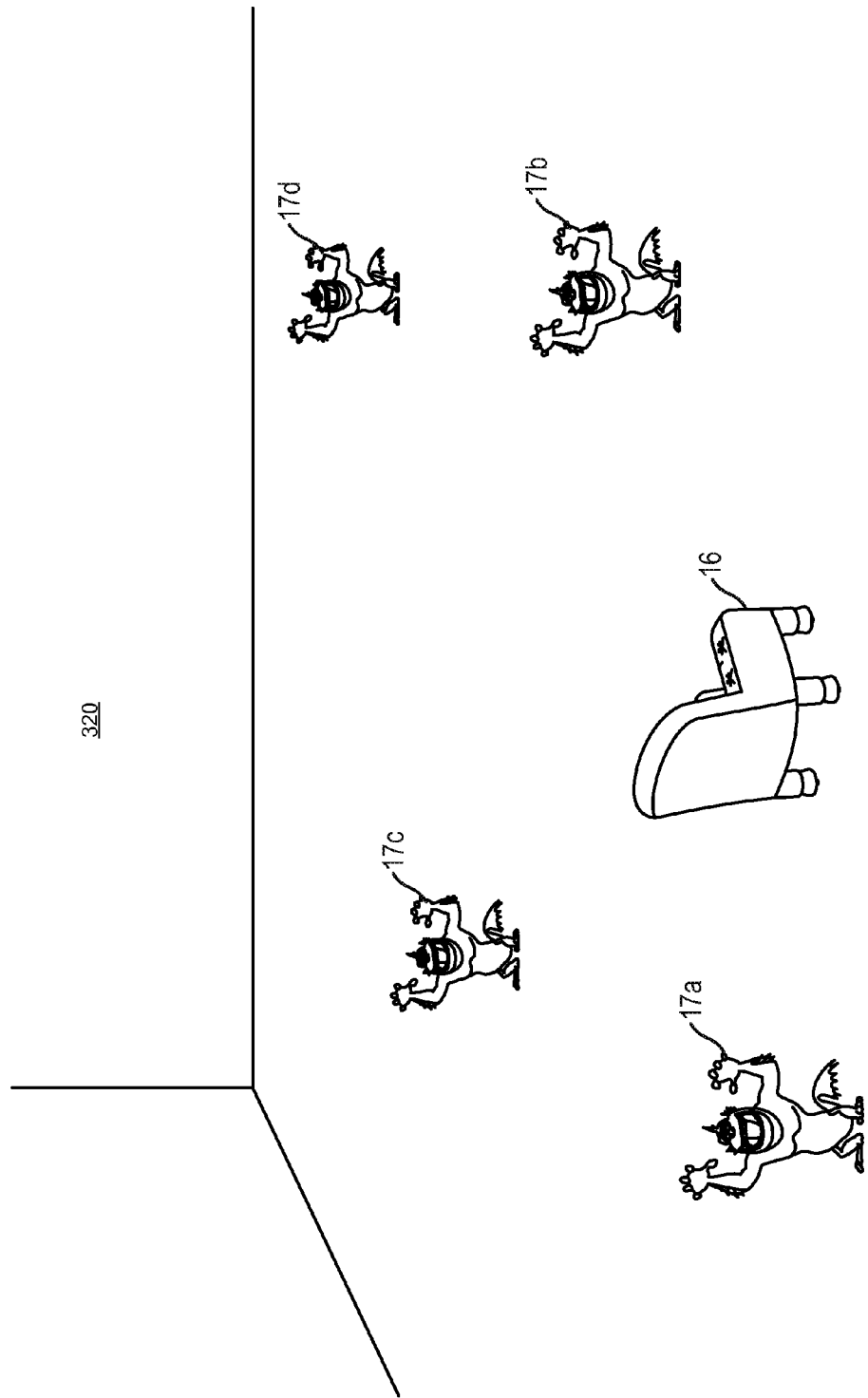

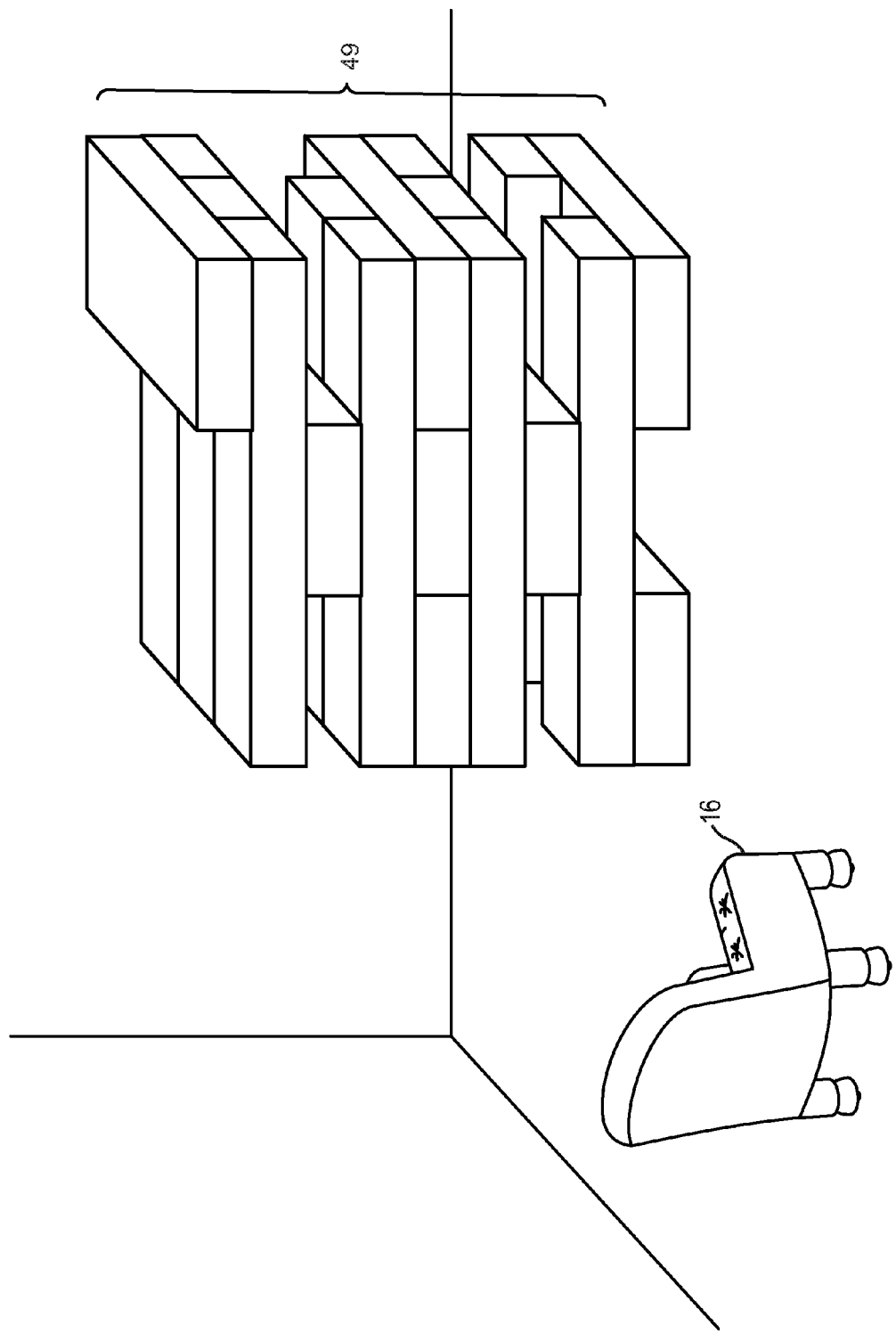

AUGMENTED REALITY PLAYSPACES WITH ADAPTIVE GAME RULES

CLAIM OF PRIORITY

This application is a continuation application of co-pending U.S. patent application Ser. No. 13/288,350, entitled "Augmented Reality Playspaces with Adaptive Game Rules," by Mount et al., filed Nov. 3, 2011, incorporated herein by reference in its entirety.

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. An AR environment may be used to enhance numerous applications including video game, mapping, navigation, and mobile device applications.

Some AR environments enable the perception of real-time interaction between real objects (i.e., objects existing in a particular real-world environment) and virtual objects (i.e., objects that do not exist in the particular real-world environment). In order to realistically integrate the virtual objects into an AR environment, an AR system typically performs several steps including mapping and localization. Mapping relates to the process of generating a map of the real-world environment. Localization relates to the process of locating a particular point of view or pose relative to the map. A fundamental requirement of many AR systems is the ability to localize the pose of a mobile device moving within a real-world environment in order to determine the particular view associated with the mobile device that needs to be augmented over time.

SUMMARY

Technology is described for generating a virtual gaming environment based on features identified within a real-world environment, and adapting the virtual gaming environment over time as the features identified within the real-world environment change. Utilizing the technology described, a person wearing a head-mounted display device (HMD) may walk around a real-world environment and play a virtual game that is adapted to that real-world environment. For example, the HMD may identify environmental features within a real-world environment such as five grassy areas and two cars, and then spawn virtual monsters based on the location and type of the environmental features identified. The location and type of the environmental features identified may vary depending on the particular real-world environment in which the HMD exists and therefore each virtual game may look different depending on the particular real-world environment.

In some embodiments, one or more virtual objects associated with a particular computing application are generated and/or adapted based on environmental features identified within a real-world environment. The real-world environment may be an emerging environment in which the locations and number of environmental features identified are not pre-defined. The one or more virtual objects may be adapted such that a degree of difficulty of a gaming application is achieved or maintained. The augmented reality environment may also include other virtual objects associated with different environmental features identified within a different real-world environment. The inclusion of the other virtual objects allows for a shared playspace in which game players located in different real-world environments may perceive and interact with the same shared playspace.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A depicts one embodiment of an augmented reality environment as seen by an end user wearing an HMD.

FIG. 3C depicts another embodiment of an augmented reality environment as seen by an end user wearing an HMD.

FIG. 3E depicts an alternative embodiment of an augmented reality environment as seen by an end user wearing an HMD.

DETAILED DESCRIPTION

Figure 1:
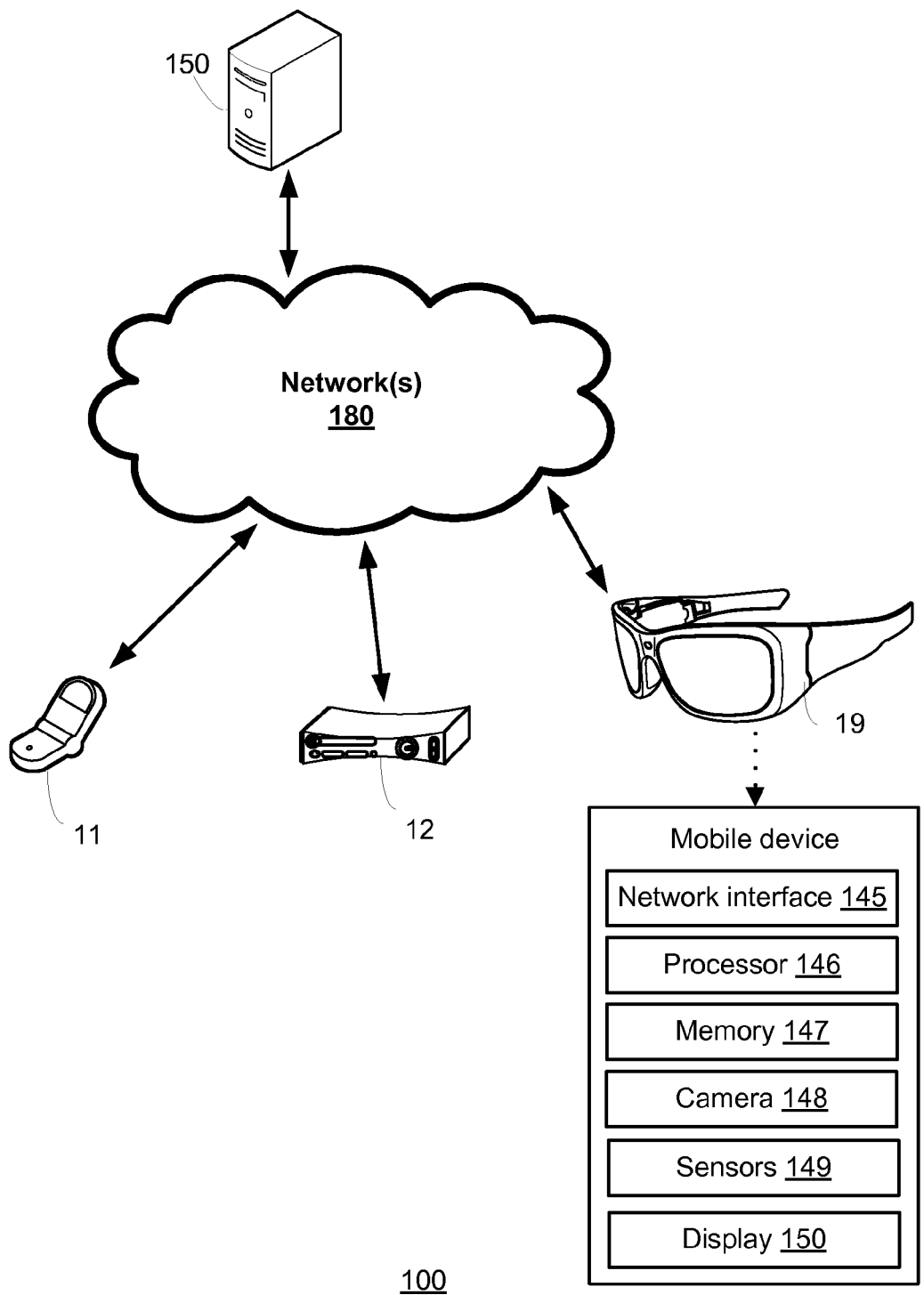
FIG. 1 is a block diagram of one embodiment of a networked computing environment in which the disclosed technology may be practiced.

Technology is described for generating a virtual gaming environment based on features identified within a real-world environment, and adapting the virtual gaming environment over time as the features identified within the real-world environment change. Utilizing the technology described, a person wearing a head-mounted display device (HMD) may walk around a real-world environment and play a virtual game that is adapted to that real-world environment. For example, the HMD may identify environmental features within a real-world environment such as five grassy areas and two cars, and then spawn virtual monsters based on the location and type of the environmental features identified. The location and type of the environmental features identified may vary depending on the particular real-world environment in which the HMD exists and therefore each virtual game may look different depending on the particular real-world environment.

With the advent and proliferation of continuously-enabled and network-connected mobile computing devices, such as head-mounted display devices (HMDs), the amount of information available to an end user of such computing devices at any given time is immense. In some cases, an augmented reality environment may be perceived by an end user of a mobile computing device. In one example, the augmented reality environment may comprise a virtual gaming environment controlled by a gaming application. The gaming application may include one of any number of different gaming applications such as virtual versions of classical board games such as chess or checkers, action games including first person shooting games, action adventure games featuring long term obstacles as well as components of action games, simulation-type games based on construction or life simulation, role playing games where an end user is cast in a particular role in one or more adventures which may or may not utilize specific skill sets, strategy games, vehicle simulation games, and social games. The virtual gaming environment may include one or more virtual objects that are generated and/or adapted based on environmental features identified within a real-world environment in which the mobile computing device exists.

One issue with providing a virtual gaming environment in which one or more virtual objects (e.g., virtual monsters) depend upon the identification of environmental features within a real-world environment involves providing mechanisms for adapting the virtual gaming environment when the environmental features change. For example, the environmental features may change as the real-world environment in which a mobile computing device exists naturally evolves (e.g., the environmental features may include non-static objects such as cars in a parking lot or people in a field). The environmental features may also change as an end user of the mobile computing device physically moves out of a first real-world environment and into a second real-world environment with significantly different environmental features. A real-world environment may comprise the viewable environment within a particular distance from a mobile computing device (e.g., the environment surrounding a mobile computing device that is within 100 feet of the mobile computing device). Furthermore, the virtual gaming environment may also have to operate in a real-world environment in which no pre-defined points of reference (e.g., fiduciary markers) or pre-defined boundaries are provided.

Another issue with providing a virtual gaming environment in which one or more virtual objects depend upon the identification of environmental features within a real-world environment involves providing game balancing such that a consistent virtual gaming environment is presented across different real-world environments. In one example, the game balancing may comprise maintaining a particular degree of difficulty associated with a virtual gaming environment across different real-world environments. The particular degree of difficulty may require, for example, that a particular number of virtual obstacles and/or virtual targets be kept constant or substantially the same within the virtual gaming environment regardless of the corresponding real-world environment. In another example, the game balancing may comprise equalizing a particular degree of difficulty associated with two different real-world environments by generating a shared playspace in which game players located in different real-world environments may perceive and interact with the same shared playspace. Thus, there is a need for an augmented reality system capable of adapting one or more virtual objects as environmental features change over time and providing game balancing across different real-world environments.

In some embodiments, an augmented reality environment includes one or more virtual objects that are generated and/or adapted based on environmental features identified within a real-world environment. The real-world environment may be an emerging environment in which the locations and number of environmental features identified are not pre-defined. The one or more virtual objects may be associated with a gaming application and automatically scaled to fit within the real-world environment. The one or more virtual objects may also be adjusted such that a degree of difficulty of the gaming application is achieved or maintained. The augmented reality environment may also include other virtual objects associated with different environmental features identified within a different real-world environment. The inclusion of the other virtual objects allows for a shared playspace in which game players located in different real-world environments may perceive and interact with the same shared playspace.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, computing environment 12, mobile device 19, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. Sensors 149 may comprise an inertial measurement unit (IMU). Display 150 may display digital images and/or videos. Display 150 may comprise a see-through display.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides a mixed reality environment for an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing the HMD, the end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment is performed by application server 150 (i.e., on the server side) while camera localization is performed on mobile device 19 (i.e., on the client side). The virtual objects may include a text description associated with a real-world object. The virtual objects may also include virtual obstacles (e.g., non-movable virtual walls) and virtual targets (e.g., virtual monsters).

In some embodiments, a mobile device, such as mobile device 19, may be in communication with a server in the cloud, such as application server 150, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server.

Figure 2:
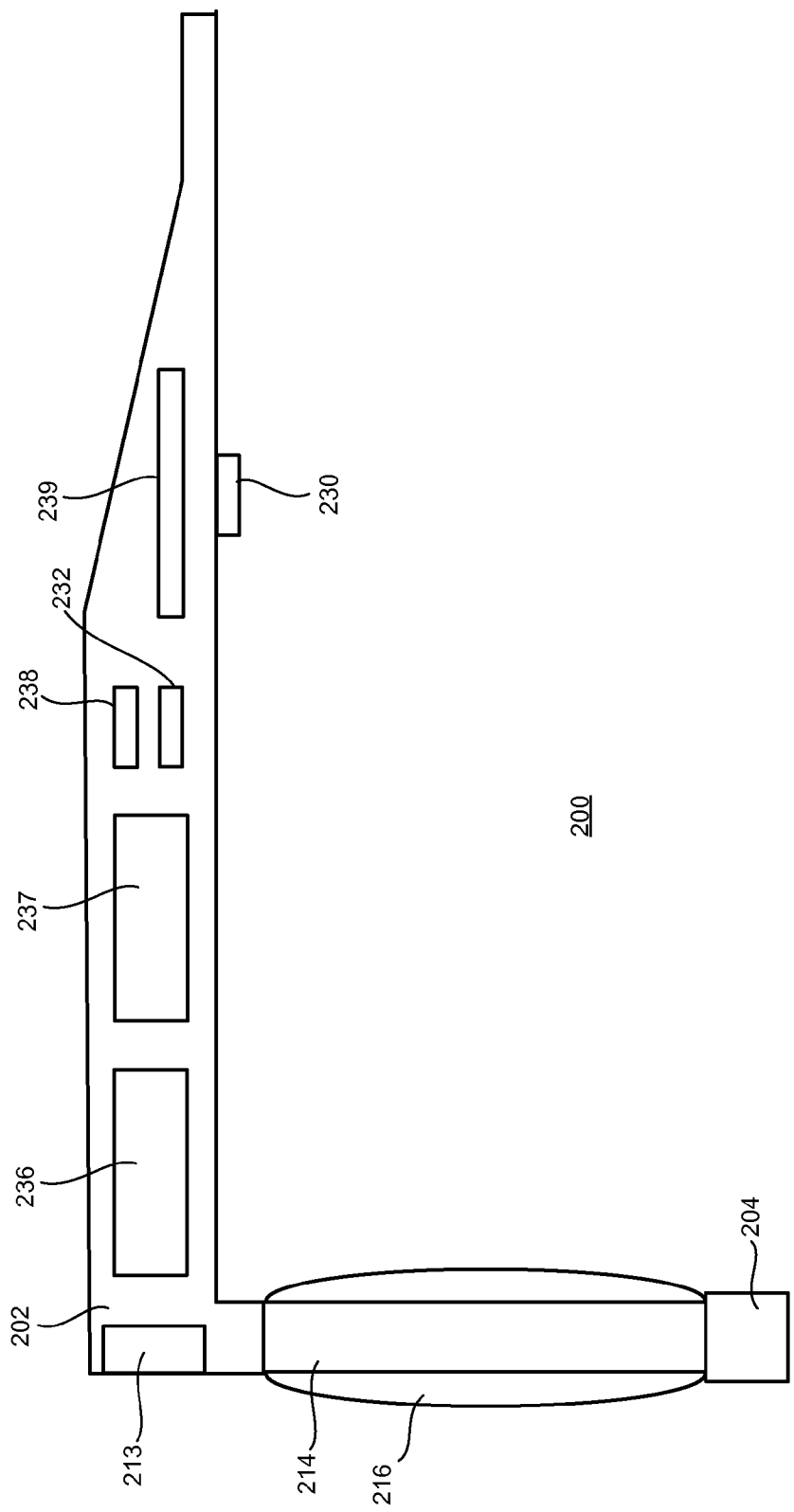
FIG. 2 depicts one embodiment of a portion of an HMD.

FIG. 2 depicts one embodiment of a portion of an HMD, such as mobile device 19 in FIG. 1. Only the right side of a head-mounted device is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes ear phones 230, motion and orientation sensor 238, GPS receiver 232, power supply 239, and wireless interface 237, all in communication with processing unit 236. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3-D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

FIGS. 3A-3E provide examples of various augmented reality environments, as seen by an end user wearing a see-through HMD, in which one or more virtual objects are generated or adapted based on environmental features identified within various real-world environments.

FIG. 3A depicts one embodiment of an augmented reality environment 310 as seen by an end user wearing an HMD, such as mobile device 19 in FIG. 1. The end user may view both real objects and virtual objects. The real objects may include a chair 16. The virtual objects may include virtual monsters 17a-b. As the virtual monsters 17a-b are displayed or overlaid over the real-world environment as perceived through the see-through lenses of the HMD, the end user of the HMD may perceive that the virtual monsters 17a-b exist within the real-world environment.

In one embodiment, augmented reality environment 310 comprises a virtual gaming environment in which the virtual monsters 17a-b are generated based on the amount of open space available within the real-world environment corresponding with augmented reality environment 310. The virtual monsters 17a-b may also be generated or spawned from various real-world objects such as chair 16.

Figure 3B:
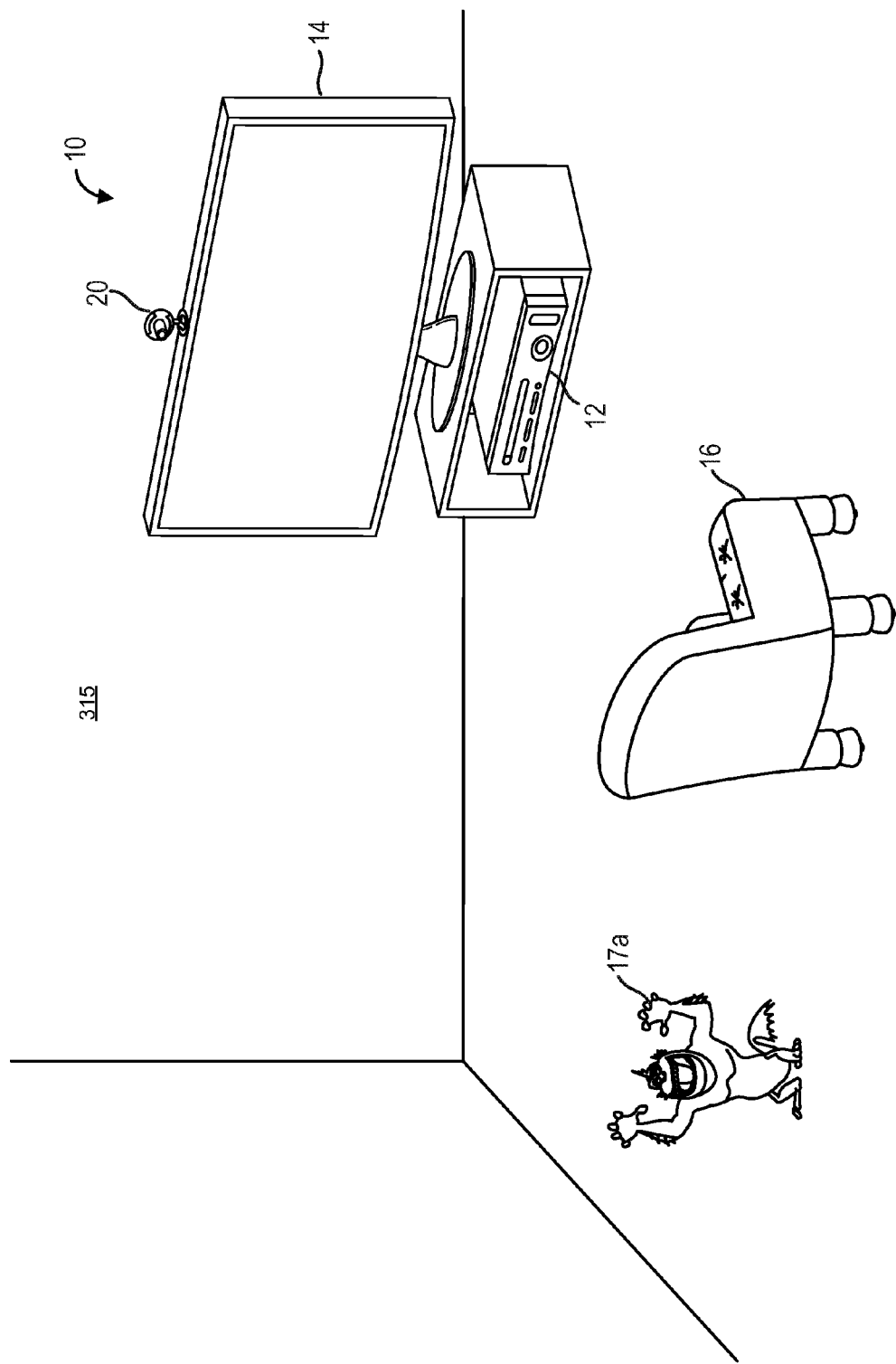
FIG. 3B depicts one embodiment of an augmented reality environment as seen by an end user wearing an HMD.

FIG. 3B depicts one embodiment of an augmented reality environment 315 as seen by an end user wearing an HMD, such as mobile device 19 in FIG. 1. The end user may view real objects and virtual objects. The real objects may include a chair 16 and a computing system 10. The virtual objects may include a virtual monster 17a. The computing system 10 may include a computing environment 12, a capture device 20, and a display 14, all in communication with each other. Computing environment 12 may include one or more processors. Capture device 20 may include one or more color or depth sensing cameras that may be used to visually monitor one or more targets including humans and one or more other real objects within a particular real-world environment. Capture device 20 may also include a microphone. In one example, capture device 20 may include a depth sensing camera and a microphone and computing environment 12 may comprise a gaming console. The computing system 10 may support multiple mobile devices or clients by providing them with virtual objects and/or mapping information regarding the real-world environment.

In some embodiments, the computing system 10 may track and analyze virtual objects within the augmented reality environment 315. The computing system 10 may also track and analyze real objects within the real-world environment corresponding with augmented reality environment 315. The rendering of images associated with virtual objects, such as virtual monster 17a, may be performed by computing system 10 or by the HMD. The computing system 10 may also provide 3-D maps associated with augmented reality environment 315 to the HMD.

FIG. 3C depicts one embodiment of an augmented reality environment 320 as seen by an end user wearing an HMD, such as mobile device 19 in FIG. 1. The end user may view both real objects and virtual objects. The real objects may include a chair 16. The virtual objects may include virtual monsters 17a-d. As the virtual monsters 17a-d are displayed or overlaid over the real-world environment as perceived through the see-through lenses of the HMD, the end user of the HMD may perceive that the virtual monsters 17a-d exist within the real-world environment.

As depicted, the real-world environment associated with augmented reality environment 320 simulates more open space compared with the real-world environment associated with augmented reality environment 310 in FIG. 3A. In order to achieve a particular degree of difficulty associated with a gaming application, the larger amount of open space may require a greater number of virtual monsters to appear within augmented reality environment 320 (e.g., dodging four virtual monsters moving within a large real-world area may be deemed as difficult as dodging two virtual monsters within a smaller real-world area). However, in other gaming applications, a larger amount of open space may correspond with a more difficult gaming environment.

Figure 3D:
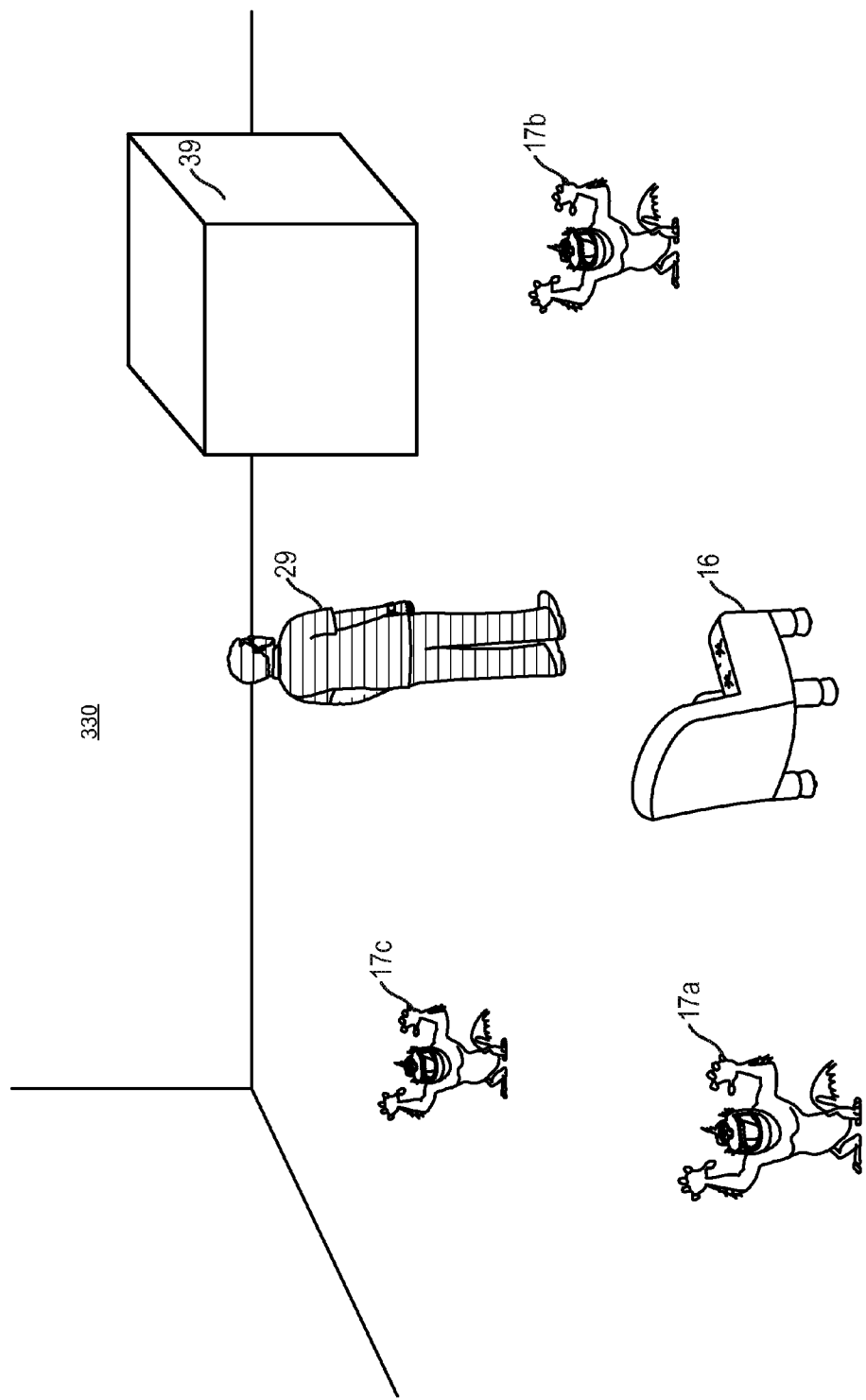
FIG. 3D depicts one embodiment of an augmented reality environment as seen by an end user wearing an HMD.

FIG. 3D depicts one embodiment of an augmented reality environment 330 as seen by an end user wearing an HMD, such as mobile device 19 in FIG. 1. The end user may view both real objects and virtual objects. The real objects may include a chair 16. The virtual objects may include virtual monsters 17a-c, a virtual person 29, and a virtual box 39. As the virtual objects are displayed or overlaid over the real-world environment as perceived through the see-through lenses of the HMD, the end user of the HMD may perceive that the virtual objects exist within the real-world environment.

In one embodiment, virtual person 29 may correspond with an environmental feature identified within a different real-world environment (e.g., a person is standing in front of another HMD in the different real-world environment). Virtual box 39 may correspond with another environmental feature identified within the different real-world environment (e.g., the person associated with virtual person 29 may be looking at a car that is represented as virtual box 39). The inclusion of virtual objects associated with a different real-world environment allows for a shared playspace in which game players located in different real-world environments may perceive and interact with the same shared playspace. For example, an end user of the other HMD in the different real-world environment may perceive a virtual object corresponding with chair 16 and real objects corresponding with virtual person 29 and virtual box 39. The virtual objects associated with a different real-world environment may be stationary (e.g., a virtual tree) or mobile over time (e.g., a virtual person).

FIG. 3E depicts one embodiment of an augmented reality environment as seen by an end user wearing an HMD, such as mobile device 19 in FIG. 1. The end user may view both real objects and virtual objects. The real objects may include a chair 16. The virtual objects may include virtual game objects 49 comprising one or more virtual blocks. As the virtual objects are displayed or overlaid over the real-world environment as perceived through the see-through lenses of the HMD, the end user of the HMD may perceive that the virtual objects exist within the real-world environment.

In one embodiment, the virtual game objects 49 are scaled such that the virtual game objects 49 may fit within an open space within the real-world environment. For example, a gaming application may require that the virtual game objects 49 need to fit within an 8 foot by 8 foot by 8 foot cube including 2 feet of buffer space so that a person can move around the virtual game objects. The amount of open space required may depend on the number of game players playing the gaming application (e.g., the amount of open space required may increase as the number of game players increases). The amount of open space required may also expand or contract based on environmental limitations determined by one or more different environments associated with each of the game players. In some cases, an augmented reality system may automatically scale the virtual game objects 49 in order to fit within a three-dimensional space that is smaller than the three-dimensional space required by the gaming application. The scaling may be applied to one or more of the dimensions associated with each of the virtual game objects 49. The augmented reality system may also suggest possible origins for virtual game objects 49 (e.g., based on the locations of one or more game players within an environment) and receive feedback from the end user of the HMD.

In one embodiment, a gaming application comprises a remote-controlled helicopter rescue game where a virtual helicopter flies within an environment subject to real-world objects and virtual objects located within the environment (e.g., the virtual helicopter cannot fly through the real-world and/or virtual objects within the environment) and rescues virtual people attached to various real-world objects and/or virtual objects within the environment. The real-world objects may include lamps, people, furniture, or walls. The virtual objects may include virtual blocks, such as virtual game objects 49, or virtual landmarks. The gaming application may require that particular real-world objects within the environment (e.g., a lamp) generate one or more virtual objects. For example, the gaming application may require that each lamp in an environment shoot out virtual lava and rocks periodically thereby providing additional virtual objects for the helicopter to maneuver around.

In some embodiments, an augmented reality system may provide one or more gaming recommendations based on environmental features identified within an environment. The one or more gaming recommendations may be based, for example, on the size of an open space. For example, a large open space may support a game of virtual laser tag, while a smaller space may be better suited for a game of virtual chess. The augmented reality environment may provide gaming recommendations based on games that an end user has already purchased or otherwise has available to them. The augmented reality system may also provide purchasing suggestions for games that an end user has not yet purchased based on the environmental features identified.

Figure 4:
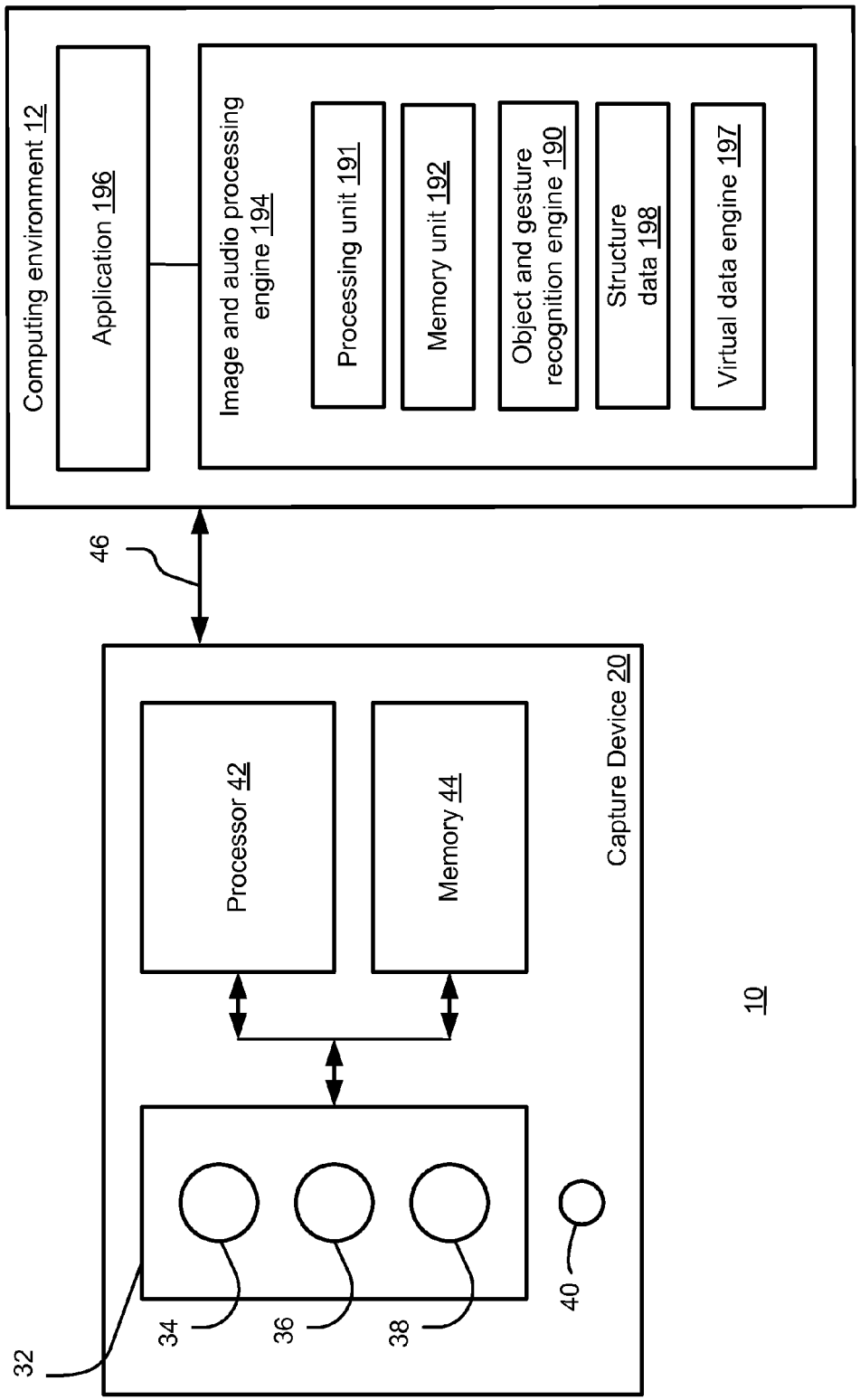
FIG. 4 illustrates one embodiment of a computing system including a capture device and computing environment.

FIG. 4 illustrates one embodiment of a computing system 10 including a capture device 20 and computing environment 12. In some embodiments, capture device 20 and computing environment 12 may be integrated within a single computing device. The single computing device may comprise a mobile device, such as mobile device 19 in FIG. 1.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 4, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3-D camera 36 and/or the RGB camera 38 to the computing environment 12 via the communication link 46.

As depicted in FIG. 4, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 5A:
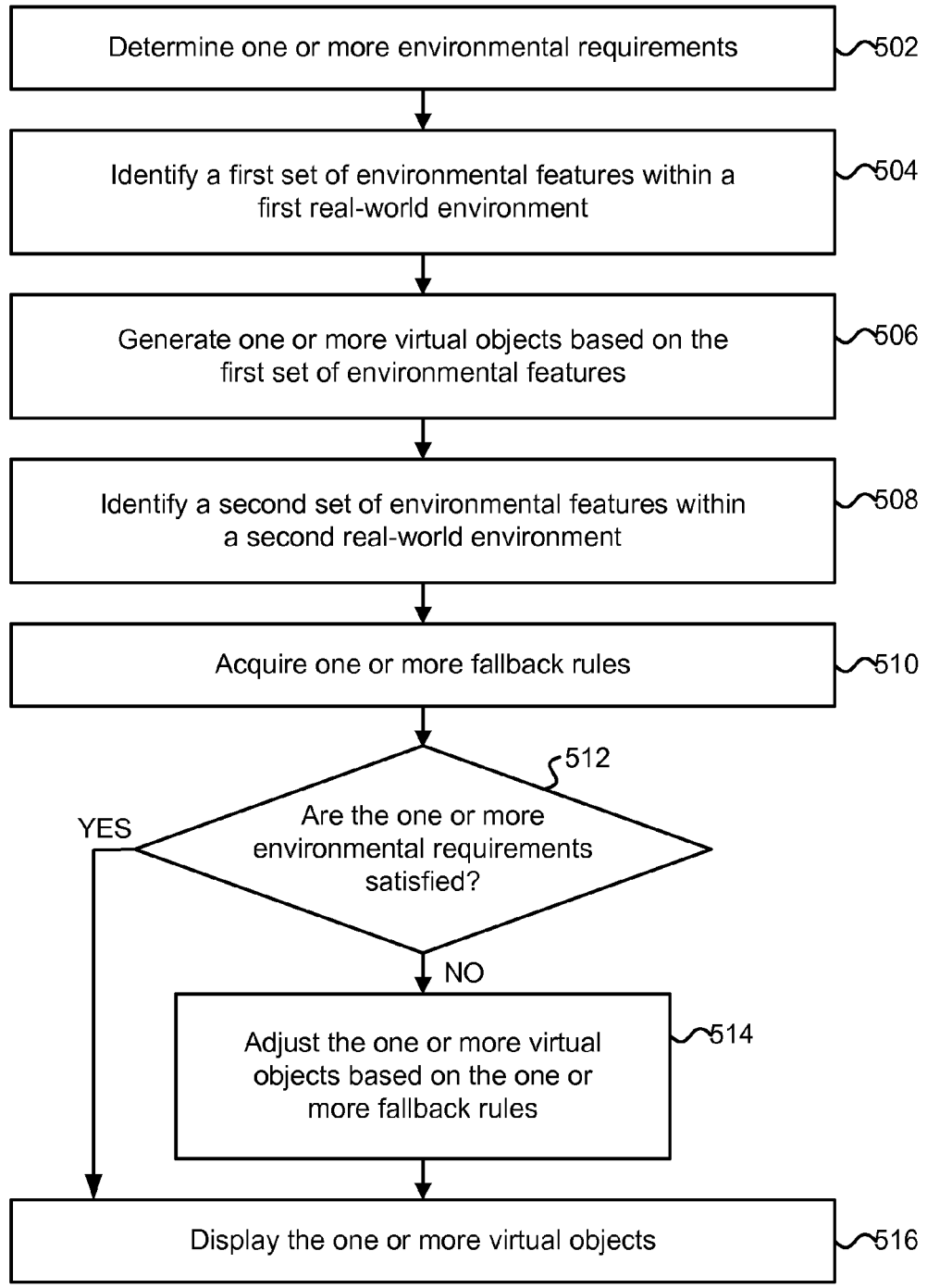
FIG. 5A is a flowchart describing one embodiment of a process for generating and adapting one or more virtual objects.
Figure 5B:
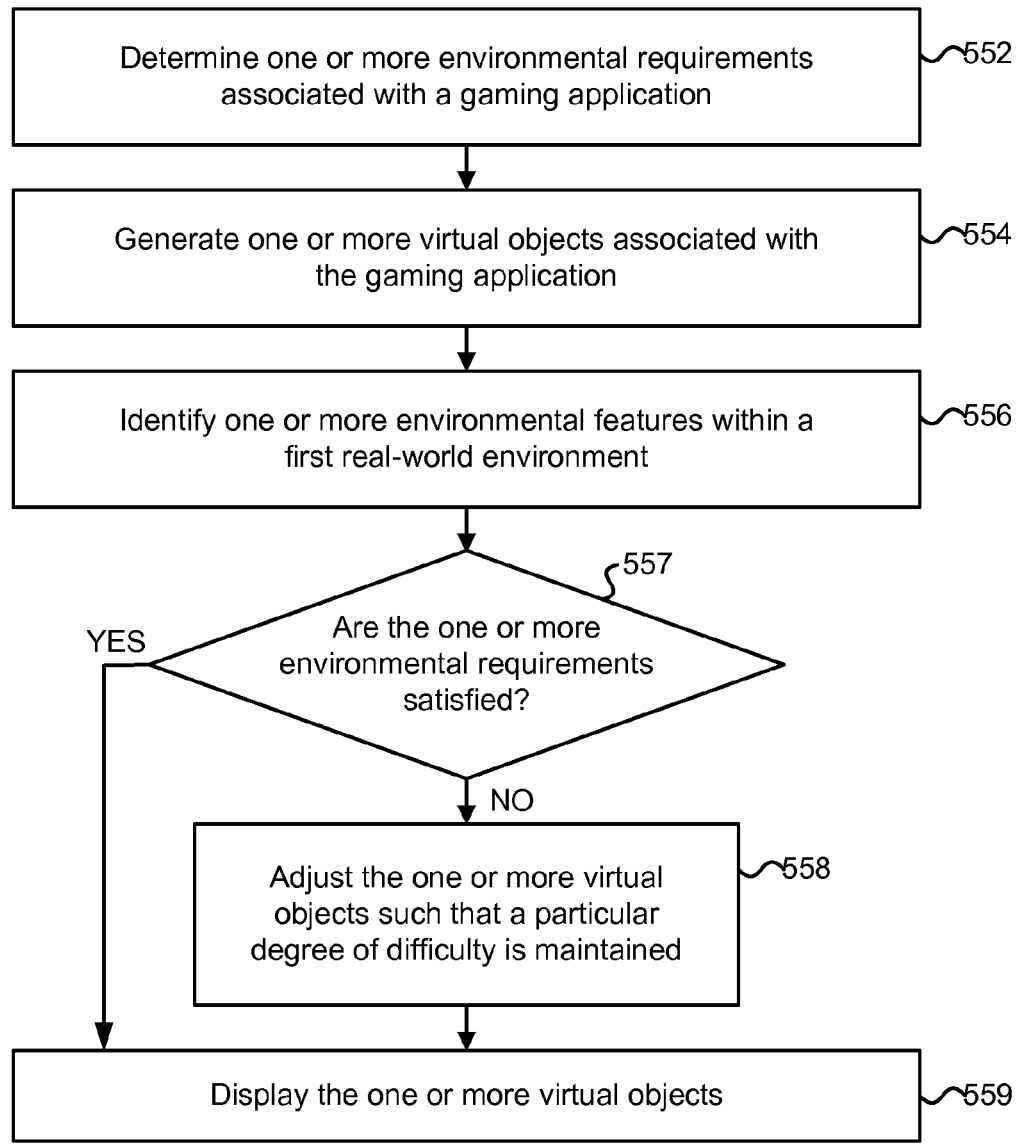
FIG. 5B is a flowchart describing an alternative embodiment of a process for generating and adapting one or more virtual objects.

FIGS. 5A and 5B provide examples of various processes for generating and/or adapting one or more virtual objects based on environmental features identified within a real-world environment. In some cases, an HMD may perform the processes described in FIGS. 5A and 5B when generating an augmented reality environment associated with a particular computing application.

FIG. 5A is a flowchart describing one embodiment of a process for generating and adapting one or more virtual objects. The process of FIG. 5A may be performed continuously and by one or more computing devices. Each step in the process of FIG. 5A may be performed by the same or different computing devices as those used in other steps, and each step need not necessarily be performed by a single computing device. In one embodiment, the process of FIG. 5A is performed by a mobile device such as mobile device 19 in FIG. 1.

In step 502, one or more environmental requirements are determined. The one or more environmental requirements may include a requirement that a real-world environment includes an open space region of at least a first area and/or volume. The one or more environmental requirements may also include a requirement that at least a particular number of environmental surfaces of a particular type exist within the real-world environment. The environmental surfaces of a particular type may include areas of grass, areas of water, areas of concrete, or flat surface areas. The one or more environmental requirements may also include a requirement that a particular number of real-world objects such as trees, cars, or people be identified within the real-world environment.

In one embodiment, the one or more environmental requirements may be determined by acquiring the one or more environmental requirements from a particular computing application. In some embodiments, the one or more environmental requirements may be determined via a negotiated process wherein the one or more environmental requirements are initially set based on application desired requirements within a real-world environment. The negotiated process may involve a computing application receiving feedback regarding environmental features within the real-world environment (e.g., the computing application may receive a ranking and/or identification of various environmental features within the real-world environment prior to determining the one or more environmental requirements).

In step 504, a first set of environmental features is identified within a first real-world environment. The first set of environmental features may include the identification and location of various objects and/or landmarks within the first real-world environment. For example, the first set of environmental features may include the identification and location of trees and cars within the first real-world environment. The first set of environmental features may also include the identification and location of various open spaces within the first real-world environment.

In some embodiments, the first set of environmental features may include light sources such as televisions, computer monitors, and lamps or other light fixtures. The first set of environmental features may also include clutter-free surfaces such as surface regions of floors, walls, or table-tops that do not contain real-world objects on their respective surfaces. For example, a clutter-free surface may include a surface region of a wall in which no pictures or other wall hangings are present. The clutter-free surfaces may be planar or non-planar surfaces.

The first set of environmental features may include a walkable mesh region. A mesh may comprise a detailed geometric representation of various features and surfaces within a particular environment or region of an environment. In some cases, the walkable mesh region may comprise a clutter-free floor space in which a person wearing an HMD may navigate without walking into real-world obstacles. Historical data associated with walkable paths previously taken by the person wearing the HMD may be utilized in order to help identify the walkable mesh region.

In one embodiment, the first set of environmental features may be used to identify one or more unique rooms or zones associated with a larger environment. In one example, the first unique room may include a kitchen and a second unique room may include a bedroom both existing within a larger environment comprising a house. The one or more unique rooms may comprise a contiguous space connected via paths between the one or more unique rooms. Each unique room or zone may be represented by its own unique mesh. In one embodiment, virtual objects (e.g., game play elements in a murder-mystery or treasure hunt adventure game) may be generated and placed into a unique room based on a predetermined relationship between various unique rooms or zones. For example, identification of the kitchen or of various virtual objects within the kitchen may cause other virtual objects to be generated and placed into the bedroom. In another embodiment, identification of a particular unique room may allow a person hearing an HMD within the unique room to view virtual objects located within a different unique room. For example, a game player in Room A may view virtual objects within Room B via a doorway or window.

In some embodiments, the first set of environmental features may be identified by utilizing surface and/or object recognition techniques. Particular environmental features such as floors or tables may be recognized by taking into account the height of a person hearing an HMD. The first set of environmental features may also be identified by first acquiring a description of the environmental features to be identified and then performing object recognition on images acquired by a mobile device associated with the first real-world environment. Geographic information associated with a geographic location of the mobile device may also be used to identify one or more environmental features. The geographic information may comprise an annotated local geography map. The geographic location of the mobile device may be determined using a GPS receiver. In one example, the geographic location of a mobile device may correspond with a particular park and the geographic information may include the identification and location of landmarks within the particular park. More information regarding identifying and locating virtual objects within a real-world environment can be found in U.S. patent application Ser. No. 13/152,220, "Distributed Asynchronous Localization and Mapping for Augmented Reality," incorporated herein by reference in its entirety.

In step 506, one or more virtual objects are generated based on the first set of environmental features identified in step 504. One embodiment of a process for generating one or more virtual objects based on a first set of environmental features identified within a real-world environment is described later in reference to FIG. 6A. In some embodiments, each virtual object of the one or more virtual objects may be generated and located within the first real-world environment based on one or more environmental features of the first set of environmental features. For example, each grassy area within the real-world environment greater than or equal to a particular size may generate a virtual monster that moves in a predetermined or random path starting from the grassy area. In another embodiment, the one or more virtual objects may be generated such that one or more virtual object requirements associated with a particular computing application are satisfied. The one or more virtual object requirements may require a particular number and type of virtual object to be generated and located within the real-world environment based on the locations of the environmental features identified. For example, every open space larger than a particular size and located between 10 feet and 30 feet from a mobile device may generate two different types of virtual monsters.

In addition to generating the one or more virtual objects based on the identification of various environmental features within a real-world environment, the one or more virtual objects may also be generated or modified based on the detection of a safety condition and/or the determination of one or more personal characteristics of an end user of a mobile device projecting an augmented reality environment. Geographic information associated with a geographic location of the mobile device may also be used to determine the location and type of virtual objects to be generated.

In step 508, a second set of environmental features is identified within a second real-world environment different from the first real-world environment. The second set of environmental features may include the identification and location of various objects and/or landmarks within the second real-world environment. For example, the second set of environmental features may include the identification and location of trees and cars within the second real-world environment. The second set of environmental features may also include the identification and location of various open spaces within the second real-world environment.

In some embodiments, the second set of environmental features may be identified by first acquiring a description of the environmental features to be identified and then performing object recognition on images acquired by a mobile device associated with the second real-world environment. Geographic information associated with a geographic location of the mobile device may also be used to identify one or more environmental features. The geographic information may comprise an annotated local geography map. The geographic location of the mobile device may be determined using a GPS receiver. In one example, the geographic location of a mobile device may correspond with a particular park and the geographic information may include the identification and location of landmarks within the particular park.

In step 510, one or more fallback rules are acquired. The one or more fallback rules may be acquired from a particular computing application. In one embodiment, the one or more fallback rules provide instructions for adjusting or modifying one or more virtual objects in the event that the one or more environmental requirements are not satisfied. The one or more fallback rules may comprise procedural rules which include rules for adjusting or modifying the one or more virtual objects based on environmental features that are unknown prior to execution of a particular computing application. In one example, procedural rules associated with a gaming application may generate or alter a particular gaming experience based on environmental features identified within an environment in real-time.

In step 512, it is determined whether the one or more environmental requirements are satisfied based on the second set of environmental features identified in step 508. If the one or more environmental requirements are satisfied then step 516 is performed. If the one or more environmental requirements are not satisfied then step 514 is performed. The one or more environmental requirements may be deemed satisfied if the second set of environmental features includes environmental features corresponding with the one or more environmental requirements.

In step 514, the one or more virtual objects are adjusted based on the one or more fallback rules. In one example, the one or more virtual objects may be adjusted by scaling the one or more virtual objects such that the one or more virtual objects fit within a particular real-world area. The one or more virtual objects may also be adjusted by adjusting a parameter associated with the virtual objects such as a speed associated with moving virtual objects (e.g., the speed at which virtual monsters move within an environment may be increased to compensate for the loss of environmental features that spawn the virtual monsters). In another example, the one or more virtual objects may be adjusted by scaling the forces applied when the one or more virtual objects collide with other virtual objects or real-world objects.

In step 516, the one or more virtual objects are displayed. One embodiment of a process for displaying one or more virtual objects is described later in reference to FIG. 6B.

FIG. 5B is a flowchart describing an alternative embodiment of a process for generating and adapting one or more virtual objects. The process of FIG. 5B may be performed continuously and by one or more computing devices. Each step in the process of FIG. 5B may be performed by the same or different computing devices as those used in other steps, and each step need not necessarily be performed by a single computing device. In one embodiment, the process of FIG. 5B is performed by a mobile device such as mobile device 19 in FIG. 1.

In step 552, one or more environmental requirements associated with a gaming application are determined. The one or more environmental requirements may include a requirement that a real-world environment includes an open space region of at least a first area and/or volume. The one or more environmental requirements may also include a requirement that at least a particular number of environmental surfaces of a particular type exist within the real-world environment. The environmental surfaces of a particular type may include areas of grass, areas of water, areas of concrete, or flat surface areas. The one or more environmental requirements may require that a particular real-world object be associated with a particular material property. For example, wood tables may generate a first type of virtual object while metal tables generate a second type of virtual object. The one or more environmental requirements may also include a requirement that a particular number of real-world objects such as trees, cars, or people be identified within the real-world environment.

In one embodiment, the one or more environmental requirements may be determined by acquiring the one or more environmental requirements from the gaming application. In some embodiments, the one or more environmental requirements may be determined via a negotiated process wherein the one or more environmental requirements are initially set based on the gaming application's desired play-space requirements. The negotiated process may involve the gaming application receiving feedback regarding environmental features within the real-world environment (e.g., the gaming application may receive a ranking and/or identification of various environmental features within the real-world environment prior to determining the one or more environmental requirements).

In step 554, one or more virtual objects associated with the gaming application are generated. The one or more virtual objects generated need not be generated based on environmental features identified within a real-world environment. One embodiment of a process for generating one or more virtual objects based on a first set of environmental features identified within a real-world environment is described later in reference to FIG. 6A. In some embodiments, each virtual object of the one or more virtual objects may be generated and located within the first real-world environment based on one or more environmental features of the first set of environmental features. For example, each grassy area within the real-world environment greater than or equal to a particular size may generate a virtual monster that moves in a predetermined or random path starting from the grassy area.

In step 556, one or more environmental features are identified within a first real-world environment. The one or more environmental features may include the identification and location of various objects and/or landmarks within the first real-world environment. For example, the one or more environmental features may include the identification and location of trees and cars within the first real-world environment. The one or more environmental features may also include the identification and location of various open spaces within the first real-world environment.

In some embodiments, the one or more environmental features may be identified by first acquiring a description of the environmental features to be identified and then performing object recognition on images acquired by a mobile device associated with the first real-world environment. Geographic information associated with a geographic location of the mobile device may also be used to identify the one or more environmental features. The geographic information may comprise an annotated local geography map. The geographic location of the mobile device may be determined using a GPS receiver. In one example, the geographic location of a mobile device may correspond with a particular park and the geographic information may include the identification and location of landmarks within the particular park. More information regarding identifying and locating virtual objects within a real-world environment can be found in U.S. patent application Ser. No. 13/152,220, "Distributed Asynchronous Localization and Mapping for Augmented Reality," incorporated herein by reference in its entirety.

In step 557, it is determined whether the one or more environmental requirements are satisfied based on the one or more environmental features identified in step 556. If the one or more environmental requirements are satisfied then step 559 is performed. If the one or more environmental requirements are not satisfied then step 558 is performed. The one or more environmental requirements may be deemed satisfied if the one or more environmental features identified in step 556 include environmental features corresponding with each of the one or more environmental requirements.

In step 558, the one or more virtual objects are adjusted such that a particular degree of difficulty is maintained. In one embodiment, the particular degree of difficulty associated with the gaming application may require that the total level of gaming difficulty considering all of the one or more virtual objects stay roughly constant. In order to provide a constant total level of gaming difficulty, the one or more virtual objects may be adjusted by scaling the one or more virtual objects such that they become harder (or easier) to target or capture. The one or more virtual objects may also be adjusted by adjusting a parameter associated with the virtual objects such as a speed associated with moving virtual objects (e.g., the speed at which virtual monsters move within an environment may be increased to compensate for the loss of environmental features that spawn the virtual monsters). In a specific example, as the number of environmental features that spawn virtual monsters decreases, the speed associated with the remaining virtual monsters may increase or the size of the remaining virtual monsters may decrease in order to make each of the remaining virtual monsters more difficult to target or capture. These adjustments to the remaining virtual monsters may allow the gaming application to maintain a particular degree of difficulty.

In one embodiment, the one or more virtual objects are adjusted such that a particular degree of difficulty is maintained depending on the ability of an end user of a mobile device to move within a real-world environment due to environmental constraints or other environmental features that limit the end user's mobility within the real-world environment. For example, a person playing a virtual game that includes dodging five virtual balls could move from an open field environment into a more constrained environment such as an office building environment causing the speed of the virtual balls to slow down in response to the more constrained environment.

In step 559, the one or more virtual objects are displayed. One embodiment of a process for displaying one or more virtual objects is described later in reference to FIG. 6B.

Figure 6A:
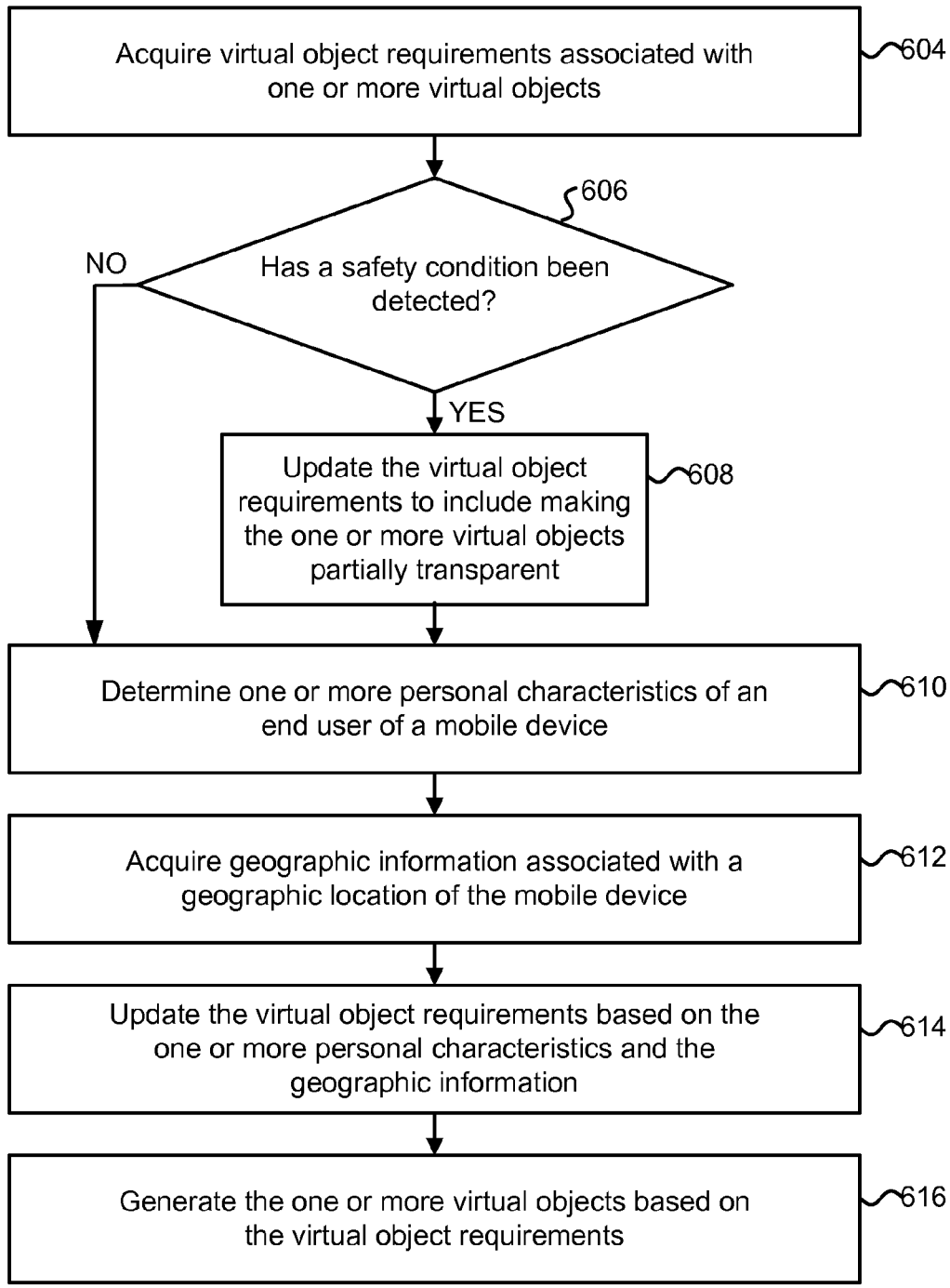
FIG. 6A is a flowchart describing one embodiment of a process for generating one or more virtual objects.

FIG. 6A is a flowchart describing one embodiment of a process for generating one or more virtual objects. The process described in FIG. 6A is one example of a process for implementing step 506 in FIG. 5A or for implementing step 554 in FIG. 5B. The process of FIG. 6A may be performed continuously and by one or more computing devices. Each step in the process of FIG. 6A may be performed by the same or different computing devices as those used in other steps, and each step need not necessarily be performed by a single computing device. In one embodiment, the process of FIG. 6A is performed by a mobile device such as mobile device 19 in FIG. 1.

In step 604, virtual object requirements associated with one or more virtual objects are acquired. The virtual object requirements may be acquired from a particular computing application, such as a gaming application. In step 606, it is determined whether a safety condition has been detected. If a safety condition has been detected, then step 608 is performed. If a safety condition has not been detected, then step 610 is performed.

In one embodiment, a safety condition may be detected if a geographic feature or location in which a mobile device exists is deemed unsafe. For example, geographic locations such as major freeways or busy streets and geographic features such as steep cliffs may be deemed unsafe. A safety condition may also be detected if particular objects are detected within a real-world environment via object recognition and/or sound recognition. For example, the presence of a police car or fire truck may be detected as a safety condition (e.g., via a siren sound being detected). In another embodiment, a safety condition may be detected if a location of a virtual object is within a particular distance of a mobile device or if a virtual object is otherwise considered to be blocking a field of view of the mobile device to an unsafe degree.

In step 608, the virtual object requirements are updated to include making the one or more virtual objects partially transparent. In some cases, the degree of transparency of a virtual object may be a function of the distance between a mobile device and the virtual object and the severity of the safety condition detected.

In step 610, one or more personal characteristics of an end user of a mobile device are determined. The one or more personal characteristics may include a height or age of an end user of the mobile device. In step 612, geographic information associated with a geographic location of the mobile device is acquired. The geographic information may include information regarding a particular park, stadium, airport, museum, or other point of interest in which the mobile device is located.

In step 614, the virtual object requirements are updated based on the one or more personal characteristics determined in step 610 and the geographic information acquired in step 612. For example, a location of a virtual object may be adjusted based on the end user's height such that the virtual object appears to exist at eye level. The virtual object may be further modified based on the acquired geographic information. For example, a virtual monster may appear to wear a sporting outfit associated with the home team of a particular stadium. In step 616, the one or more virtual objects are generated based on the virtual object requirements.

Figure 6B:
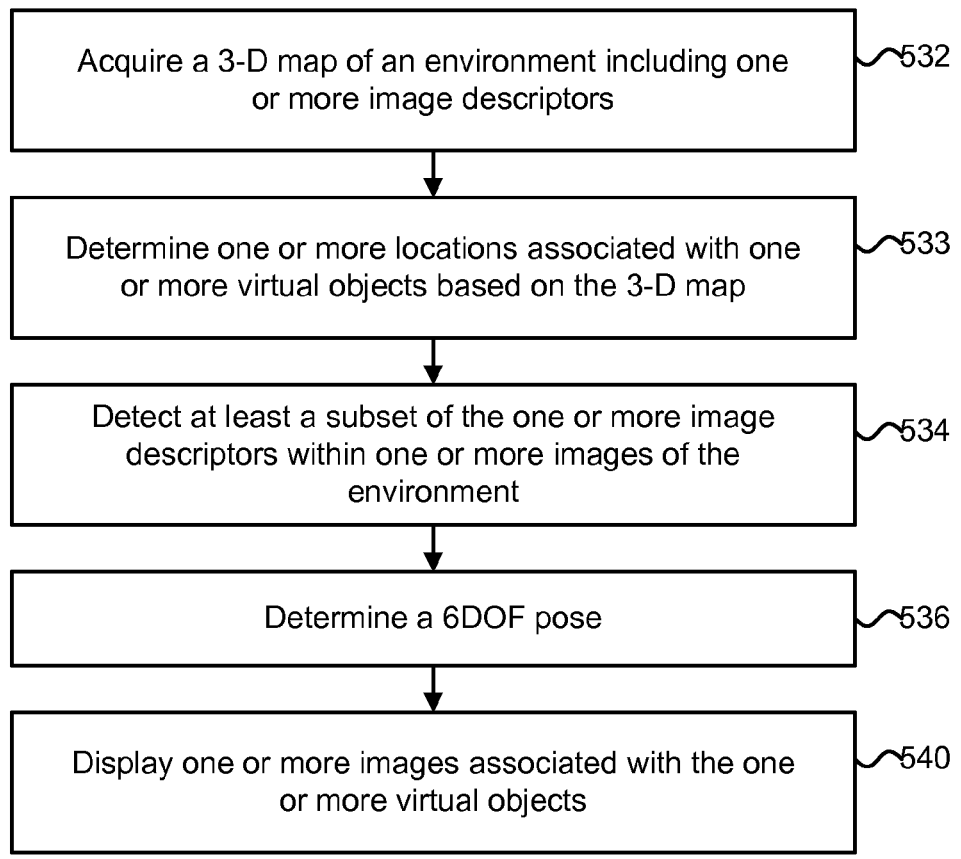
FIG. 6B is a flowchart describing one embodiment of a process for displaying one or more virtual objects.

FIG. 6B is a flowchart describing one embodiment of a process for displaying one or more virtual objects. The process described in FIG. 6B is one example of a process for implementing step 516 in FIG. 5A or for implementing step 559 in FIG. 5B. The process of FIG. 6B may be performed continuously and by one or more computing devices. Each step in the process of FIG. 6B may be performed by the same or different computing devices as those used in other steps, and each step need not necessarily be performed by a single computing device. In one embodiment, the process of FIG. 6B is performed by a mobile device such as mobile device 19 in FIG. 1.

In step 532, a 3-D map of an environment is acquired. The 3-D map may include one or more image descriptors. One embodiment of a process for acquiring a 3-D map is described later in reference to FIG. 6C. In step 533, one or more locations associated with one or more virtual objects are determined based on the 3-D map acquired in step 532. In step 534, at least a subset of the one or more image descriptors are detected within one or more images of the environment. The one or more image descriptors may be detected by applying various image processing methods such as object recognition, feature detection, corner detection, blob detection, and edge detection methods to the one or more images. The one or more image descriptors may be used as landmarks in determining a particular pose, position, and/or orientation in relation to the 3-D map. An image descriptor may include color and/or depth information associated with a particular object (e.g., a red apple) or a portion of a particular object within the particular environment (e.g., the top of a red apple).

In step 536, a six degree of freedom (6DOF) pose may be determined including information associated with the position and orientation of a mobile device within the environment. In step 540, one or more images associated with the one or more virtual objects are rendered and displayed such that the one or more virtual objects are perceived to exist within the environment. More information regarding the registering virtual objects and rendering corresponding images in an augmented reality environment can be found in U.S. patent application Ser. No. 13/152,220, "Distributed Asynchronous Localization and Mapping for Augmented Reality," incorporated herein by reference in its entirety.

Figure 6C:
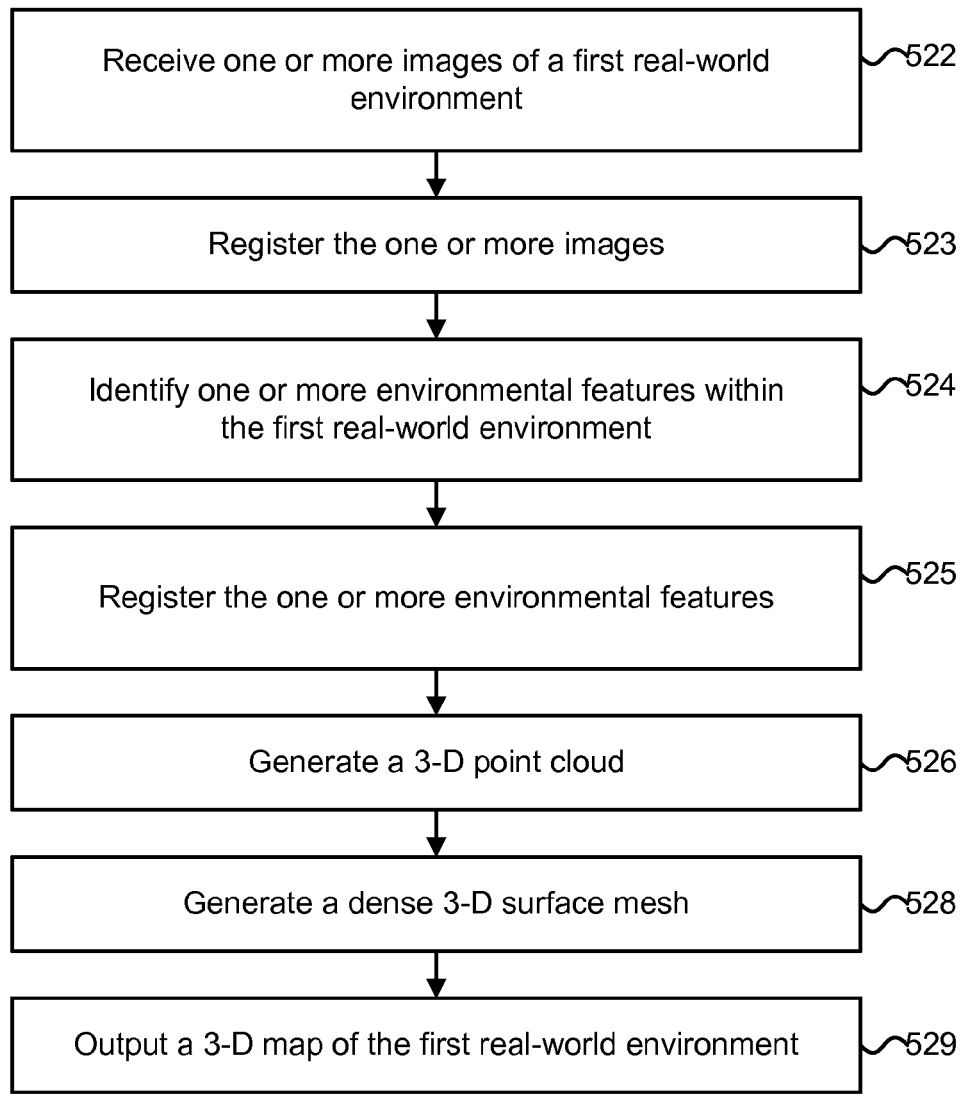
FIG. 6C is a flowchart describing one embodiment of a process for acquiring a 3-D map.

FIG. 6C is a flowchart describing one embodiment of a process for acquiring a 3-D map. The process described in FIG. 6C is one example of a process for implementing step 532 in FIG. 6B. The process of FIG. 6C may be performed continuously and by one or more computing devices. Each step in the process of FIG. 6C may be performed by the same or different computing devices as those used in other steps, and each step need not necessarily be performed by a single computing device. In one embodiment, the process of FIG. 6C is performed by a mobile device such as mobile device 19 in FIG. 1.

In step 522, one or more images of a first real-world environment are received. In step 523, the one or more images are registered or aligned with a coordinate system associated with the first real-world environment. During image registration, different images taken within the first real-world environment (e.g., images from different points of view, taken at different points in time, and/or images associated with different types of information such as color or depth information) may be registered into a single real-world coordinate system associated with the first real-world environment.

In step 524, one or more environmental features within the first real-world environment are identified. In step 525, the one or more environmental features are registered. In one example, image and object registration into a common coordinate system may be performed using an extrinsic calibration process. The registration and/or alignment of images (or objects within the images) onto a common coordinate system allows a computing application to be able to compare and integrate real-world objects, landmarks, or other features extracted from the different images into a unified 3-D map associated with the first real-world environment. In step 526, a 3-D point cloud is generated. In step 528 a dense 3-D surface mesh is generated. In step 529, a 3-D map of the first real-world environment is outputted. The outputted 3-D map may comprise a 3-D point cloud and/or a dense 3-D surface mesh. More information regarding the generation of 3-D maps can be found in U.S. patent application Ser. No. 13/017,690, "Three-Dimensional Environment Reconstruction," incorporated herein by reference in its entirety.

Figure 7:
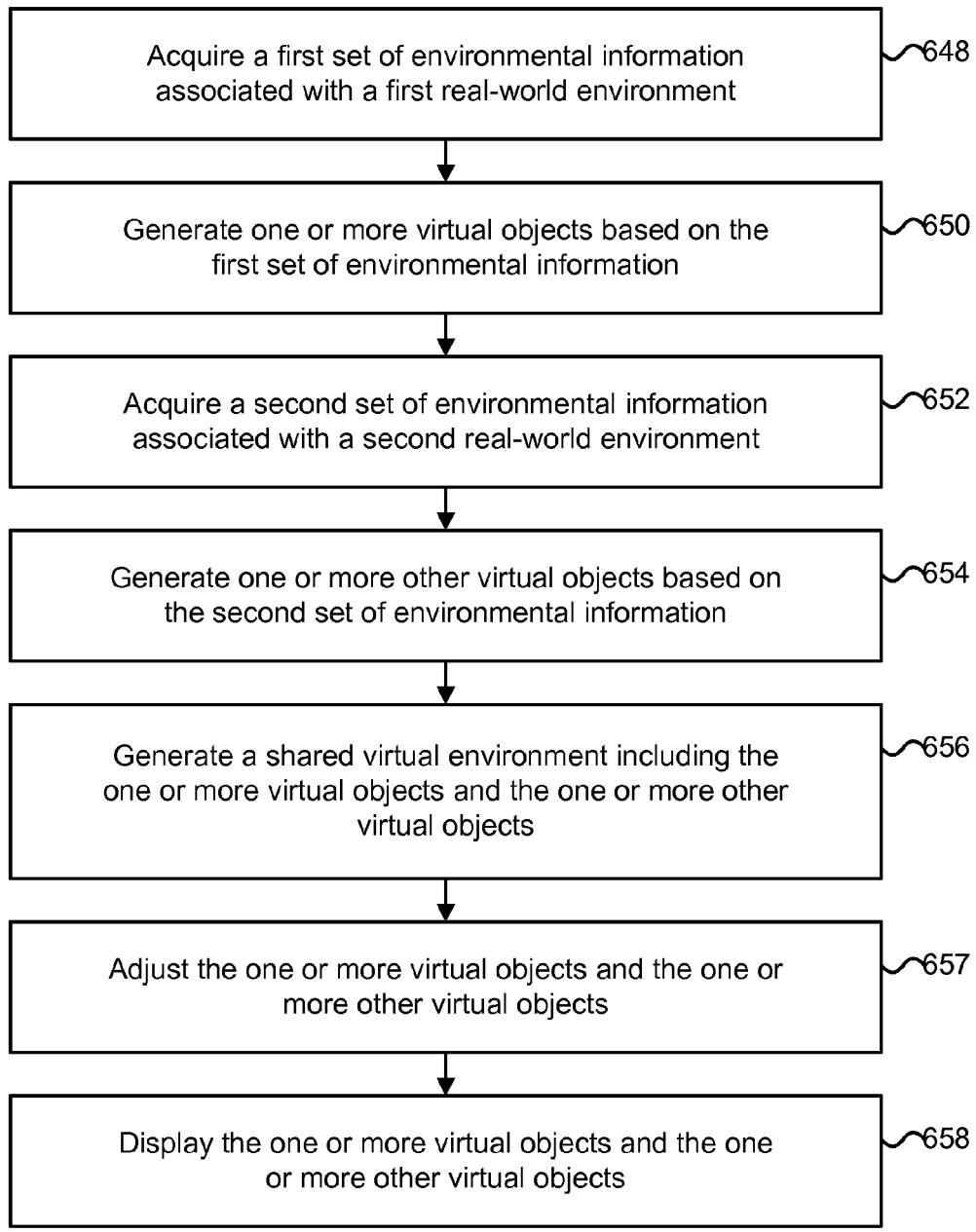
FIG. 7 is a flowchart describing one embodiment of a process for generating and adapting virtual objects associated with a plurality of different real-world environments.

FIG. 7 is a flowchart describing one embodiment of a process for generating and adapting virtual objects associated with a plurality of different real-world environments. The process of FIG. 7 may be performed continuously and by one or more computing devices. Each step in the process of FIG. 7 may be performed by the same or different computing devices as those used in other steps, and each step need not necessarily be performed by a single computing device. In one embodiment, the process of FIG. 7 is performed by a mobile device such as mobile device 19 in FIG. 1.

In step 648, a first set of environmental information associated with a first real-world environment is acquired. The first set of environmental information may include the identity and location of one or more environmental features within the first real-world environment. In step 650, one or more virtual objects are generated based on the first set of environmental information acquired in step 648. One embodiment of a process for generating one or more virtual objects based on a first set of environmental features identified within a real-world environment was described previously in reference to FIG. 6A.

In step 652, a second set of environmental information associated with a second real-world environment is acquired. The second set of environmental information may include the identity and location of one or more environmental features within the second real-world environment. In step 654, one or more other virtual objects are generated based on the second set of environmental information acquired in step 652.

In step 656, a shared virtual environment is generated. The shared virtual environment may include the one or more virtual objects and the one or more other virtual objects. By combining the one or more virtual objects and the one or more other virtual objects into a shared virtual environment, end users of mobile devices located in different real-world environments may perceive and interact with the same shared virtual environment. For example, the shared virtual environment may comprise a shared playspace in which a plurality of game players may view and interact with the one or more virtual objects and the one or more other virtual objects. In a particular example, the shared virtual environment may comprise a virtual soccer field and the one or more virtual objects may include a virtual soccer ball that may be kicked by each of the plurality of game players. The size of the virtual soccer field may be determined based on the number of game players.

In one embodiment, the one or more virtual objects may correspond with gaming objects and the one or more other virtual objects may correspond with environmental features identified within the second real-world environment. In another embodiment, the one or more virtual objects may correspond with a first set of gaming objects generated based on environmental features identified within the first real-world environment and the one or more other virtual objects may correspond with a second set of gaming objects generated based on environmental features identified within the second real-world environment.

In step 657, the one or more virtual objects and the one or more other virtual objects are adjusted. In some embodiments, the one or more virtual objects and the one or more other virtual objects are adjusted such that a particular degree of gaming difficulty is maintained. The one or more virtual objects and the one or more other virtual objects may also be adjusted by scaling the virtual objects such that the one or more virtual objects and the one or more other virtual objects fit within a shared playspace associated with both the first real-world environment and the second real-world environment.

In step 658, the one or more virtual objects and the one or more other virtual objects are displayed. One embodiment of a process for displaying one or more virtual objects was described previously in reference to FIG. 6B.

One embodiment of the disclosed technology includes determining one or more environmental requirements associated with a particular computing application, generating one or more virtual objects associated with the particular computing application, identifying one or more environmental features within a first real-world environment, determining if the one or more environmental requirements are not satisfied based on the one or more environmental features, adjusting the one or more virtual objects such that a particular degree of difficulty of the particular computing application is achieved, and displaying on a mobile device one or more images associated with the one or more virtual objects, the one or more images are displayed such that the one or more virtual objects are perceived to exist within the first real-world environment.

One embodiment of the disclosed technology includes determining one or more environmental requirements associated with a particular computing application, identifying a first set of environmental features within a first real-world environment, generating one or more virtual objects associated with the particular computing application, identifying a second set of environmental features within a second real-world environment different from the first real-world environment, determining if the one or more environmental requirements are not satisfied based on the second set of environmental features, acquiring one or more fallback rules, adjusting the one or more virtual objects based on the one or more fallback rules in response to the determining if the one or more environmental requirements are not satisfied, and displaying on a mobile device one or more images associated with the one or more virtual objects, the one or more images are displayed such that the one or more virtual objects are perceived to exist within the first real-world environment.

One embodiment of the disclosed technology includes a memory, one or more processors, and a display. The memory stores one or more environmental requirements associated with a particular computing application, The one or more processors generate one or more virtual objects associated with the particular computing application, identify one or more environmental features within a first real-world environment, determine if the one or more environmental requirements are not satisfied based on the one or more environmental features, and adjust the one or more virtual objects such that a particular degree of difficulty of the particular computing application is achieved. The display displays one or more images associated with the one or more virtual objects, the one or more images are displayed such that the one or more virtual objects are perceived to exist within the first real-world environment.

Figure 8:
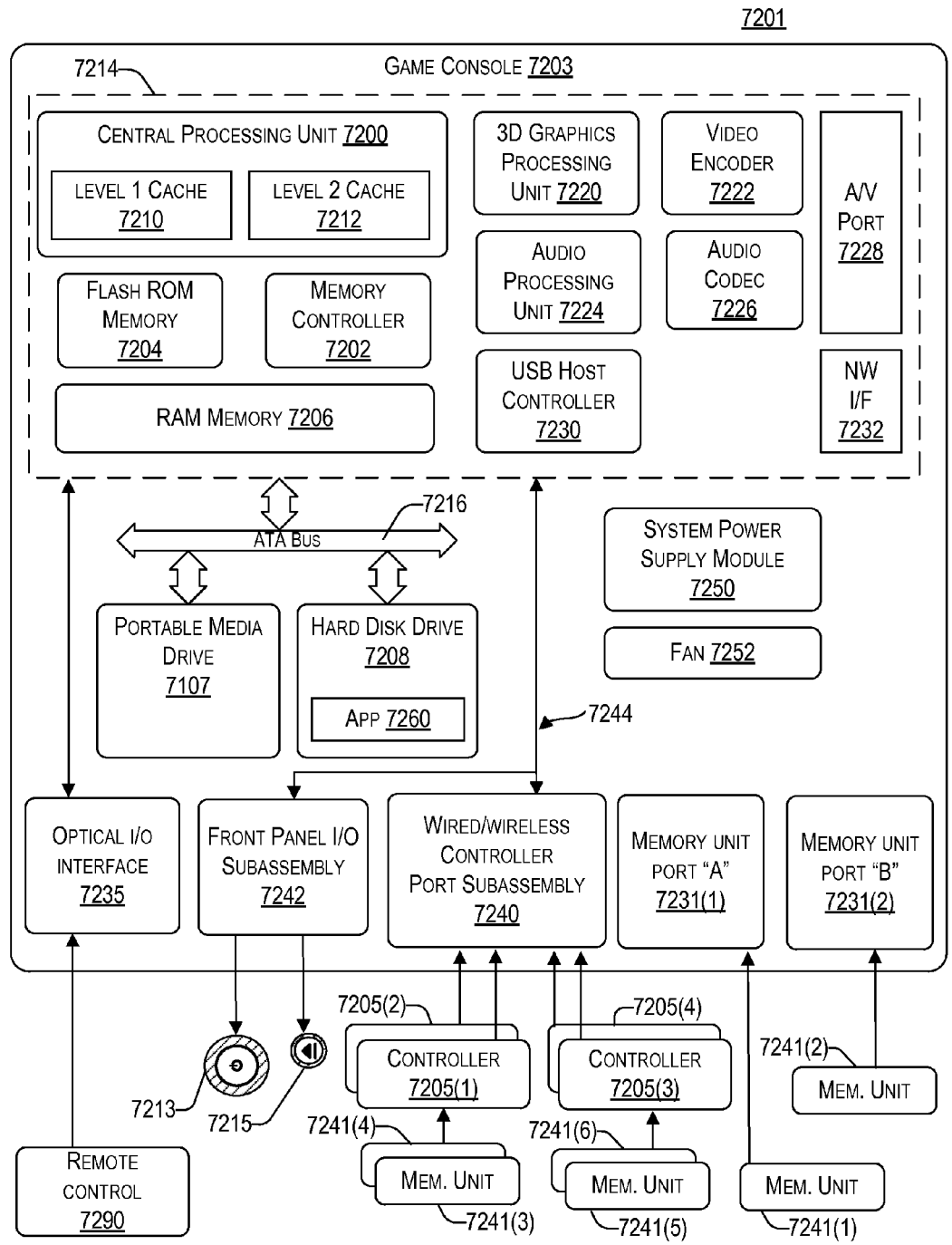
FIG. 8 is a block diagram of an embodiment of a gaming and media system.
Figure 9:
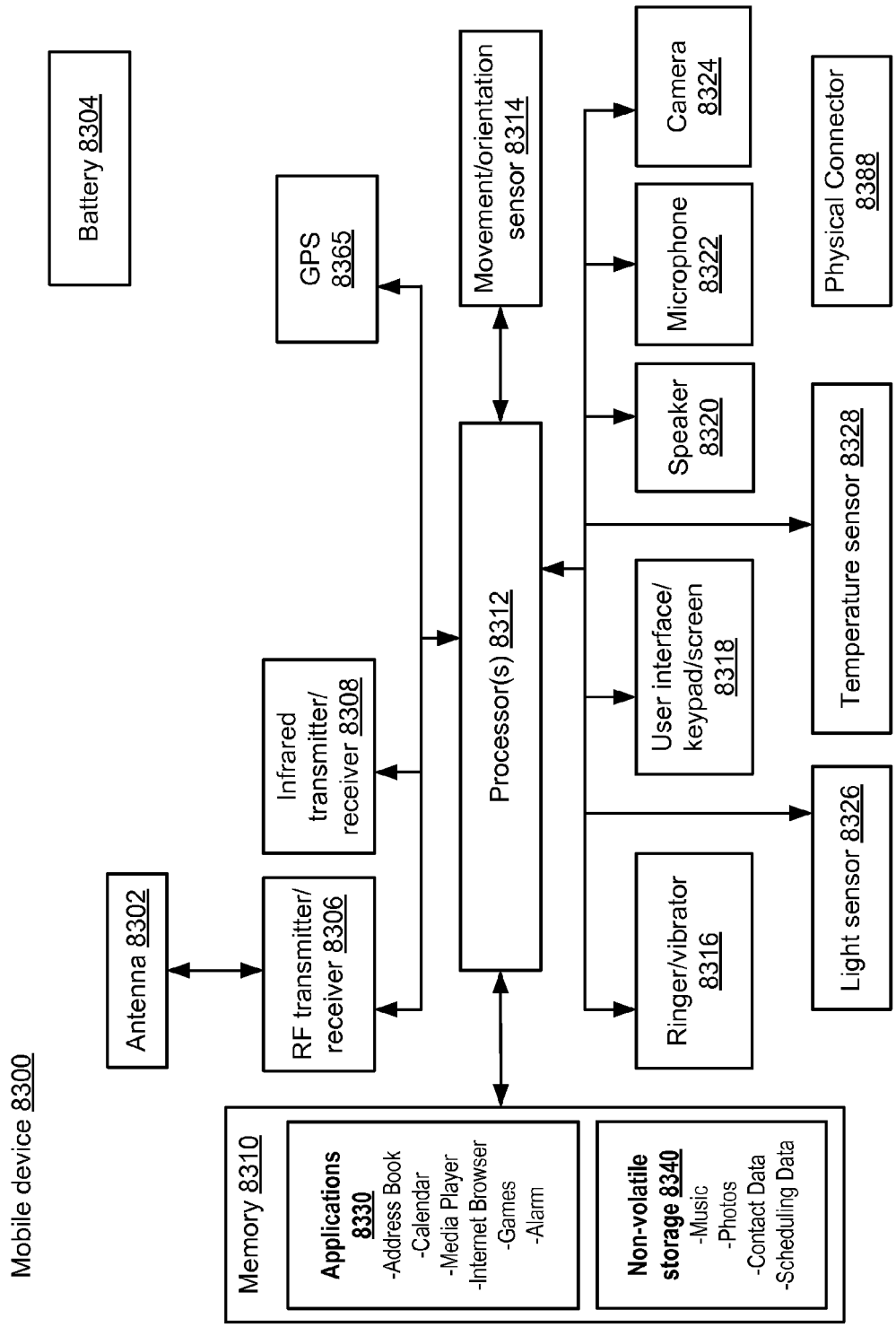
FIG. 9 is a block diagram of one embodiment of a mobile device.
Figure 10:
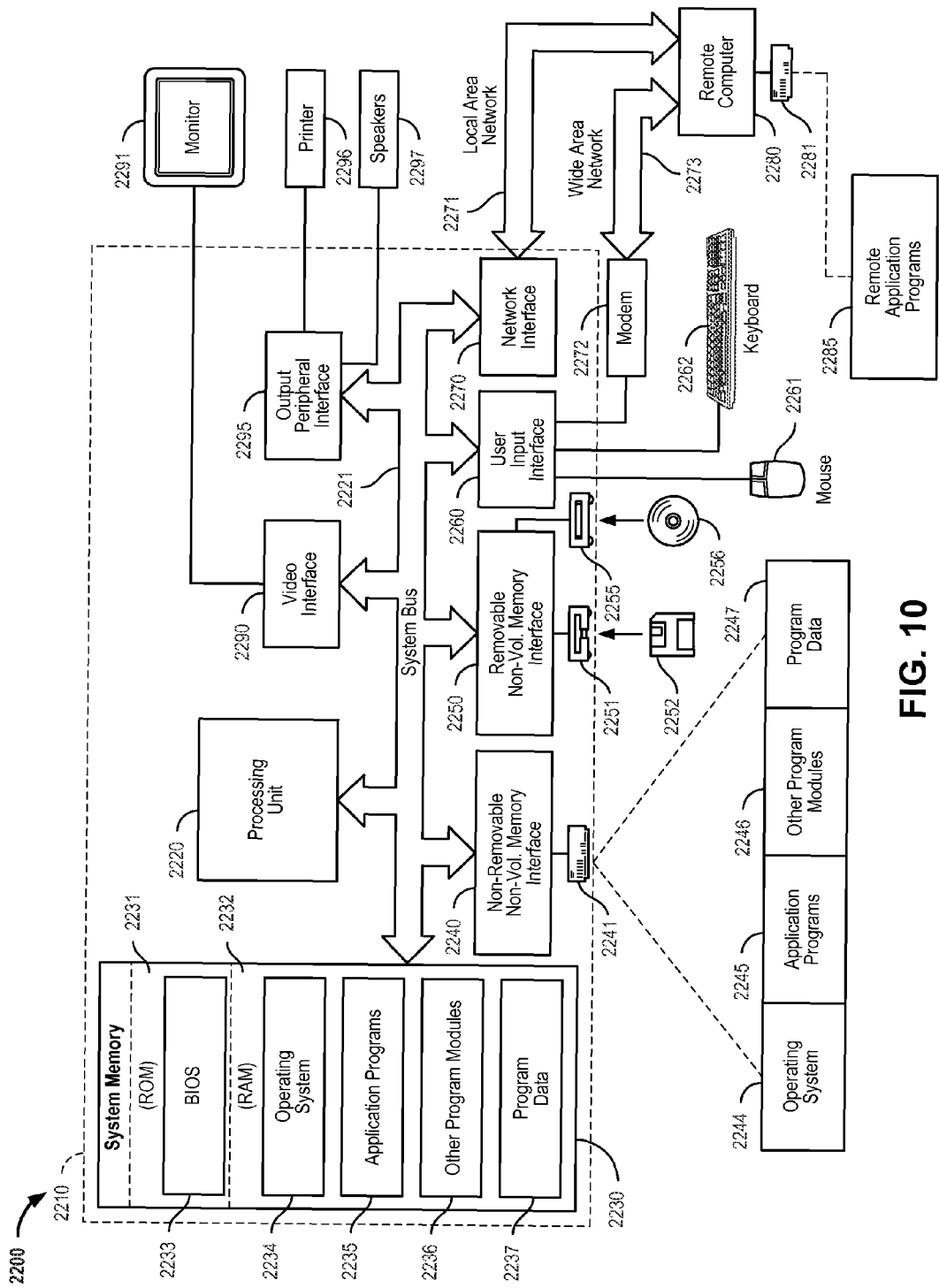
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201, which is one example of computing environment 12 in FIG. 3B. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an NV (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300, such as mobile device 19 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computing system 10 in FIG. 3B. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating an augmented reality environment, comprising:
   generating one or more virtual objects associated with a computing application using a mobile device, the one or more virtual objects include a first virtual object;
   identifying one or more real-world objects within a first real-world environment that are of a particular type;
   acquiring a computing application requirement that a particular number of real-world objects of the particular type be identified within the first real-world environment from the computing application;
   determining that a number of the one or more real-world objects identified within the first real-world environment of the particular type is not equal to the particular number of real-world objects required by the computing application;
   adjusting the one or more virtual objects in response to determining that the number of the one or more real-world objects identified within the first real-world environment of the particular type is not equal to the particular number of real-world objects required by the computing application, the one or more virtual objects include a first virtual object that moves within the augmented reality environment;
   detecting a particular sound using the mobile device;
   determining a distance between the first virtual object within the augmented reality environment and the mobile device;
   setting a degree of transparency for the first virtual object based on the distance between the first virtual object within the augmented reality environment and the mobile device in response to detecting the particular sound;
   generating one or more images associated with the first virtual object based on the degree of transparency; and
   displaying on the mobile device the one or more images, the one or more images are displayed such that the first virtual object is perceived to exist within the augmented reality environment.

2. The method of claim 1,
   wherein: the adjusting the one or more virtual objects includes increasing a speed associated with the first virtual object.

3. The method of claim 2, wherein:
   the adjusting the one or more virtual objects includes scaling a size of the first virtual object.

4. The method of claim 1, wherein
   the one or more images are displayed using the mobile device such that the first virtual object is perceived to be partially transparent.

5. The method of claim 2, further comprising:
   determining one or more personal characteristics associated with an end user of the mobile device, the one or more personal characteristics include a height of the end user;
   determining one or more locations within the first real-world environment associated with the one or more virtual objects; and
   modifying the one or more locations associated with the one or more virtual objects based on the one or more personal characteristics prior to the displaying.

6. The method of claim 1, further comprising:
   determining a geographic location associated with the mobile device; and
   modifying the one or more virtual objects based on the geographic location prior to the displaying.

7. The method of claim 1, further comprising:
   acquiring environmental information associated with a second real-world environment;
   generating one or more other virtual objects based on the environmental information;
   adjusting the one or more other virtual objects; and
   displaying on the mobile device one or more other images associated with the one or more other virtual objects, the one or more other images are displayed such that the one or more other virtual objects are perceived to exist within the augmented reality environment.

8. The method of claim 2, wherein:
   the first real-world environment comprises an emerging environment in which locations corresponding with the one or more real-world objects are not pre-defined;
   the particular sound corresponds with a siren sound; and
   the mobile device comprises a see-through HMD.

9. One or more storage devices containing processor readable code for programming one or more processors to perform a method for generating an augmented reality environment comprising the steps of:
   identifying a first set of real-world objects within a first real-world environment;
   generating one or more virtual objects associated with a computing application, the generating one or more virtual objects includes generating the one or more virtual objects based on the first set of real-world objects;
   identifying a second set of real-world objects within a second real-world environment different from the first real-world environment that are of a particular type, the identifying a second set of real-world objects is performed subsequent to the generating one or more virtual objects;
   acquiring a computing application requirement that a particular number of real-world objects of the particular type be identified within the second real-world environment from the computing application;
   determining that a number of the second set of real-world objects identified within the second real-world environment of the particular type is not equal to the particular number of real-world objects required by the computing application;
   adjusting the one or more virtual objects in response to the determining that the number of the second set of real-world objects identified within the second real-world environment of the particular type is not equal to the particular number of real-world objects required by the computing application, the one or more virtual objects include a first virtual object that moves within the augmented reality environment;

displaying on a mobile device one or more images associated with the one or more virtual objects, the one or more images are displayed such that the one or more virtual objects are perceived to exist within the second real-world environment;

detecting a particular sound within the second real-world environment; determining a distance between the first virtual object within the augmented reality environment and the mobile device:

setting a degree of transparency for the first virtual object based on the distance between the first virtual object within the augmented reality environment and the mobile device in response to detecting the particular sound;

generating one or more new images associated with the first virtual object based on the degree of transparency; and displaying on the mobile device the one or more new images such that the first virtual object is perceived to be partially transparent within the second real-world environment in response to detecting the particular sound.

10. The one or more storage devices of claim 9, wherein: the second set of real-world objects of the particular type comprises one of trees, cars, or people and wherein: the adjusting to one or more virtual objects includes increasing a speed associated with the first virtual object.

11. The one or more storage devices of claim 9, wherein: the adjusting the one or more virtual objects includes scaling a size of the first virtual object.

12. The one or more storage devices of claim 9, wherein: the particular sound corresponds with a siren sound.

13. The one or more storage devices of claim 9, further comprising:

determining one or more personal characteristics associated with an end user of the mobile device, the one or more personal characteristics include a height of the end user;

registering the one or more virtual objects, the registering determines one or more locations within the first real-world environment associated with the one or more virtual objects; and modifying the one or more locations associated with the one or more virtual objects based on the one or more personal characteristics prior to the displaying.

14. The one or more storage devices of claim 9, further comprising:

acquiring landmark information associated with the second real-world environment;

generating one or more other virtual objects based on the landmark information; and displaying on the mobile device one or more other images associated with the one or more other virtual objects, the one or more other images are displayed such that the one or more other virtual objects are perceived to exist within the first real-world environment.

15. An electronic device for generating an augmented reality environment, comprising:

one or more processors configured to identify one or more real-world objects within a first real-world environment and generate one or more virtual objects associated with a computing application based on the one or more real-world objects, the one or more processors configured to identify one or more other real-world objects within a second real-world environment different from the first real-world environment that are of a particular type and acquire a computing application requirement that a particular number of real-world objects of the particular type be identified within the second real-world environment from the computing application, the one or more processors configured to determine that a number of the one or more other real-world objects identified within the second real-world environment that are of the particular type is not equal to the particular number of real-world objects required by the computing application, the one or more processors configured to adjust the one or more virtual objects in response to determining that the number of the one or more other real-world objects identified within the second real-world environment that are of the particular type is not equal to the particular number of real-world objects required by the computing application, the one or more virtual objects include a first virtual object that moves within the augmented reality environment, and detect a particular sound within the second real-world environment, the one or more processors configured to determine a distance between the first virtual object within the augmented reality environment and the electronic device and set a degree of transparency for the first virtual object based on the distance between the first virtual object within the augmented reality environment and the electronic device in response to detecting the particular sound, the one or more processors configured to generate one or more images associated with the first virtual object based on the degree of transparency; and a display configured to display the one or more images, the one or more images are displayed such that the first virtual object is perceived to exist within the augmented reality environment.

16. The electronic device of claim 15, wherein: the one or more other real-world objects of the particular type comprise one of trees, cars, or people and wherein: the one or more processors configured to adjust the one or more virtual objects by increasing a speed associated with the first virtual object.

17. The electronic device of claim 15, wherein: the particular sound corresponds with a siren sound.

18. The electronic device of claim 15, wherein:

the one or more processors configured to determine a height of the end user;

the one or more processors configured to register the one or more virtual objects; and the one or more processors configured to modify one or more locations associated with the one or more virtual objects based on the height of the end user.

19. The electronic device of claim 17, wherein:

the one or more processors configured to acquire landmark information associated with a second real-world environment;

the one or more processors configured to generate one or more other virtual objects based on the landmark information; and the display configured to display one or more other images associated with the one or more other virtual objects, the one or more other images are displayed such that the one or more other virtual objects are perceived to exist within the second real-world environment.

20. The electronic device of claim 15, wherein:
the first real-world environment comprises an emerging environment in which locations corresponding with the one or more other real-world objects are not pre-defined; and
the electronic device comprises a see-through HMD.

\* \* \* \* \*